(12) United States Patent
Furst et al.

(10) Patent No.: US 8,194,275 B2
(45) Date of Patent: Jun. 5, 2012

(54) APPARATUS FOR LOW COST EMBEDDED PLATFORM FOR DEVICE-SIDE, DISTRIBUTED SERVICES ENABLEMENT

(75) Inventors: Michael R. Furst, Rochester, NY (US);
Loranzo Whitfield, Fairport, NY (US);
Naveen Sharma, Perinton, NY (US);
Ronald M. Rockwell, Rocheter, NY (US); Tracy E. Thieret, Webster, NY (US); Claude S. Fillion, Rochester, NY (US); Weixia Huang, Rochester, NY (US); Michael P. Kehoe, Rochester, NY (US); Arturo M. Lorenzo, Fairport, NY (US); Mary C. McCorkindale, Fairport, NY (US); Robert J. St. Jacques, Fairport, NY (US); Michael F. Cavanaugh, Webster, NY (US); Christopher J. Regruit, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/334,917

(22) Filed: Dec. 22, 2011

(65) Prior Publication Data

US 2012/0092727 A1    Apr. 19, 2012

Related U.S. Application Data

(62) Division of application No. 10/687,142, filed on Oct. 16, 2003.

(60) Provisional application No. 60/319,622, filed on Oct. 16, 2002, provisional application No. 60/319,623, filed on Oct. 17, 2002, provisional application No. 60/319,624, filed on Oct. 17, 2002, provisional application No. 60/319,625, filed on Oct. 17, 2002.

(51) Int. Cl.
    *G03G 15/00*     (2006.01)

(52) U.S. Cl. ............................. 358/1.15; 399/9; 358/1.9
(58) Field of Classification Search ........................ None
See application file for complete search history.

(56) References Cited

U.S. PATENT DOCUMENTS

| | | | |
|---|---|---|---|
| 4,959,860 | A | 9/1990 | Watters et al. |
| 5,220,674 | A | 6/1993 | Morgan et al. |
| 5,305,199 | A | 4/1994 | LoBiondo et al. |

(Continued)

FOREIGN PATENT DOCUMENTS

EP        685768        2/1995

(Continued)

OTHER PUBLICATIONS

Distrributed Management Task Force et al; "Common information model CIM specification" V.2.2 Announcement Distributed Management Task Force, Jun. 14, 1999, pp. 1-105.

(Continued)

*Primary Examiner* — Twyler Haskins
*Assistant Examiner* — Lennin Rodriguez
(74) *Attorney, Agent, or Firm* — Fay Sharpe LLP

(57) ABSTRACT

A class of add-on system components providing functionality of devices, management of self-help, customization and enhancement of services for devices, and remote monitoring at significantly reduced cost. It reduces the cost of UI and greatly enhances ease-of-use by realizing that the networked system can be headless and use a browser-based UI for its platform. It embeds a Device Model Agent (DMA) and connects to the Device-Centric Services platform to offer services. Additionally, it offers customized diagnostic access for customer representatives to enable self-help service actions to be performed, unifies and manages multiple access needs to several disparate data access mechanisms, and uses largely COTS PC hardware rather than customized PWBs.

20 Claims, 19 Drawing Sheets

U.S. PATENT DOCUMENTS

| | | | |
|---|---|---|---|
| 5,384,620 | A | 1/1995 | Ebner et al. |
| 5,574,848 | A | 11/1996 | Thomson |
| 5,612,884 | A | 3/1997 | Haines |
| 5,887,216 | A | 3/1999 | Motoyama |
| 5,893,008 | A | 4/1999 | Budnik et al. |
| 5,960,167 | A | 9/1999 | Roberts et al. |
| 6,003,065 | A | 12/1999 | Yan et al. |
| 6,167,448 | A | 12/2000 | Hemphill et al. |
| 6,226,097 | B1 | 5/2001 | Kimura |
| 6,233,409 | B1 | 5/2001 | Haines et al. |
| 6,317,748 | B1 | 11/2001 | Menzies et al. |
| 6,427,168 | B1 | 7/2002 | McCollum |
| 6,463,078 | B1 | 10/2002 | Engstrom et al. |
| 6,486,966 | B1 | 11/2002 | Takahashi et al. |
| 6,496,858 | B1 | 12/2002 | Frailong et al. |
| 6,631,407 | B1 | 10/2003 | Mukaiyama et al. |
| 6,782,345 | B1 | 8/2004 | Siegel et al. |
| 6,871,163 | B2 | 3/2005 | Hiller et al. |
| 6,922,684 | B1 | 7/2005 | Aldridge et al. |
| 6,931,546 | B1 | 8/2005 | Kouznetsov et al. |
| 6,947,161 | B2 | 9/2005 | Suyehira |
| 6,947,903 | B1 | 9/2005 | Perry |
| 6,947,949 | B2 | 9/2005 | Fujisawa |
| 6,965,928 | B1 | 11/2005 | Cox |
| 6,965,931 | B2 | 11/2005 | Helms |
| 6,970,257 | B2 | 11/2005 | Endo et al. |
| 6,970,885 | B1 | 11/2005 | Shah et al. |
| 6,970,902 | B1 | 11/2005 | Moon |
| 6,976,262 | B1 | 12/2005 | Davis et al. |
| 6,982,804 | B2 | 1/2006 | Frolik et al. |
| 7,003,560 | B1 | 2/2006 | Mullen et al. |
| 7,013,092 | B2 | 3/2006 | Hayward et al. |
| 7,043,738 | B2 | 5/2006 | Mandal et al. |
| 7,065,740 | B2 | 6/2006 | Westerinen et al. |
| 7,096,194 | B2 | 8/2006 | Johnson |
| 7,111,304 | B2 | 9/2006 | Hand et al. |
| 7,123,608 | B1 | 10/2006 | Scott et al. |
| 7,126,716 | B1 | 10/2006 | Kaufman et al. |
| 7,131,124 | B2 | 10/2006 | Hanyu |
| 7,146,413 | B2 | 12/2006 | Spitzer et al. |
| 7,152,039 | B1 | 12/2006 | Cheng et al. |
| 7,187,459 | B2 | 3/2007 | Chiba et al. |
| 7,200,601 | B1 | 4/2007 | Bradley et al. |
| 7,213,046 | B2 | 5/2007 | Barillaud |
| 7,213,231 | B1 | 5/2007 | Bandhole et al. |
| 7,219,124 | B2 | 5/2007 | Cerami et al. |
| 7,239,413 | B2 | 7/2007 | Owen et al. |
| 7,240,109 | B2 | 7/2007 | Wookey et al. |
| 7,254,601 | B2 | 8/2007 | Baller et al. |
| 7,260,623 | B2 | 8/2007 | Wookey |
| 7,287,085 | B1 | 10/2007 | Motoyama et al. |
| 7,337,242 | B1 | 2/2008 | Motoyama et al. |
| 7,376,725 | B2 | 5/2008 | Takahashi et al. |
| 7,392,307 | B2 | 6/2008 | Motoyama et al. |
| 7,428,723 | B2 | 9/2008 | Greene et al. |
| 7,463,373 | B2 | 12/2008 | Lapstun et al. |
| 7,466,442 | B2 | 12/2008 | Chapman |
| 7,468,804 | B2 | 12/2008 | Wei |
| 7,487,112 | B2 | 2/2009 | Barnes, Jr. |
| 7,508,533 | B2 | 3/2009 | Lee |
| 7,528,980 | B2 | 5/2009 | Tanaka |
| 7,533,333 | B2 | 5/2009 | Motoyama et al. |
| 7,715,039 | B2 | 5/2010 | Zimmerman |
| 2001/0027469 | A1 | 10/2001 | Torikai |
| 2002/0049839 | A1 | 4/2002 | Miida et al. |
| 2002/0069112 | A1 | 6/2002 | Abdelhadi et al. |
| 2002/0072998 | A1 | 6/2002 | Haines et al. |
| 2002/0113989 | A1 | 8/2002 | Ferlitsch et al. |
| 2002/0133581 | A1 | 9/2002 | Schwartz |
| 2002/0140966 | A1 | 10/2002 | Meade et al. |
| 2002/0143819 | A1 | 10/2002 | Han et al. |
| 2002/0143924 | A1 | 10/2002 | Iga |
| 2002/0147611 | A1 | 10/2002 | Greene et al. |
| 2002/0165805 | A1 | 11/2002 | Varga et al. |
| 2002/0184300 | A1 | 12/2002 | Schmeling et al. |
| 2002/0188504 | A1 | 12/2002 | Whale |
| 2003/0004784 | A1 | 1/2003 | Li et al. |
| 2003/0004832 | A1 | 1/2003 | Kamimotot et al. |
| 2003/0005091 | A1 | 1/2003 | Ullmann et al. |
| 2003/0014650 | A1 | 1/2003 | Freed et al. |
| 2003/0033445 | A1 | 2/2003 | Simpson et al. |
| 2003/0051041 | A1 | 3/2003 | Kalavade et al. |
| 2003/0061104 | A1 | 3/2003 | Thomson et al. |
| 2003/0132963 | A1 | 7/2003 | Barker et al. |
| 2003/0177183 | A1 | 9/2003 | Cabrera et al. |
| 2003/0193685 | A1 | 10/2003 | Kageyama |
| 2003/0204480 | A1 | 10/2003 | Heinrichs et al. |
| 2004/0015559 | A1 | 1/2004 | Goldstein |
| 2004/0068454 | A1 | 4/2004 | Jacobus et al. |
| 2004/0111315 | A1 | 6/2004 | Sharma |
| 2004/0111699 | A1 | 6/2004 | Rockwell |
| 2004/0111709 | A1 | 6/2004 | Furst |
| 2004/0125403 | A1 | 7/2004 | Furst et al. |
| 2004/0128375 | A1 | 7/2004 | Rockwell |
| 2004/0128669 | A1 | 7/2004 | Furst |
| 2005/0004974 | A1 | 1/2005 | Sharma |
| 2005/0155042 | A1 | 7/2005 | Kolb et al. |
| 2005/0262202 | A1 | 11/2005 | Motoyama et al. |
| 2006/0015570 | A1 | 1/2006 | Khemani et al. |
| 2006/0041563 | A1 | 2/2006 | Fujisawa |
| 2007/0055746 | A1 | 3/2007 | Oran et al. |

FOREIGN PATENT DOCUMENTS

| | | |
|---|---|---|
| EP | 1 061 445 A | 12/2000 |
| JP | 8-166912 | 6/1996 |
| JP | 2002-222096 | 8/2002 |
| JP | 2002-287990 | 10/2002 |
| JP | 2003263419 A | 9/2003 |
| JP | 2004220556 | 8/2004 |

OTHER PUBLICATIONS

Thompson, P.: "Successful practices in developing a complex information model", conceptual modeling-ER, International conference on conceptual modeling, Nov. 3, 1997, pp. 376-393.

EP Search Report, EP 0302 3602, May 23, 2005.

Thomas, Douglas J, and Griffin, Paul, M., "Coordinated Supply Chain Management", European Journal of Operational Research, vol. 94, Issue 1, Oct. 11, 1996, pp. 1-15.

"Java TM 2 Platform Micro Edition (J2METM) Technology for Creating Mobile Devices", Sun Microsystems, 2000; retrieved from http://www.cs.purdue.edu/s3/projects/jvm/papers/KVMwp.pdf, on Jan. 31, 2007.

Tanenbaum, Andrew S., "Computer Networks", Third Edition, Prentice Hall PTR, 1996; pp. 685-691.

Silberschatz, Avl; Peter Galvin; Greg Gagne, "Applied Operating System Concepts", First Edition, John Wiley & Sons, Inc., 2000; pp. 638-642.

Machine Translation to English of Item AM (JP 8-166912).

*FIG. 6*
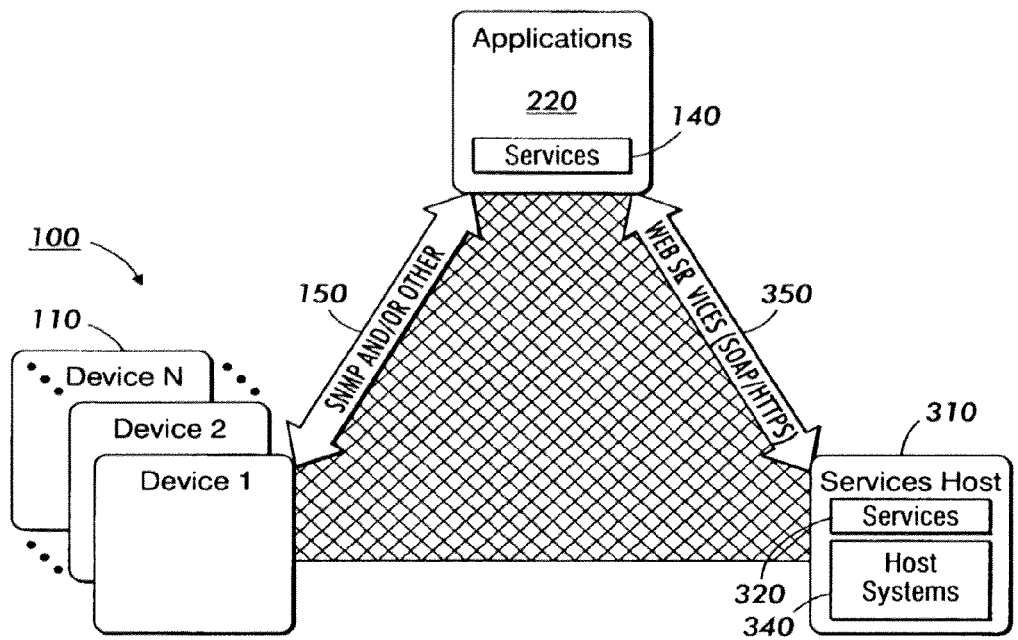
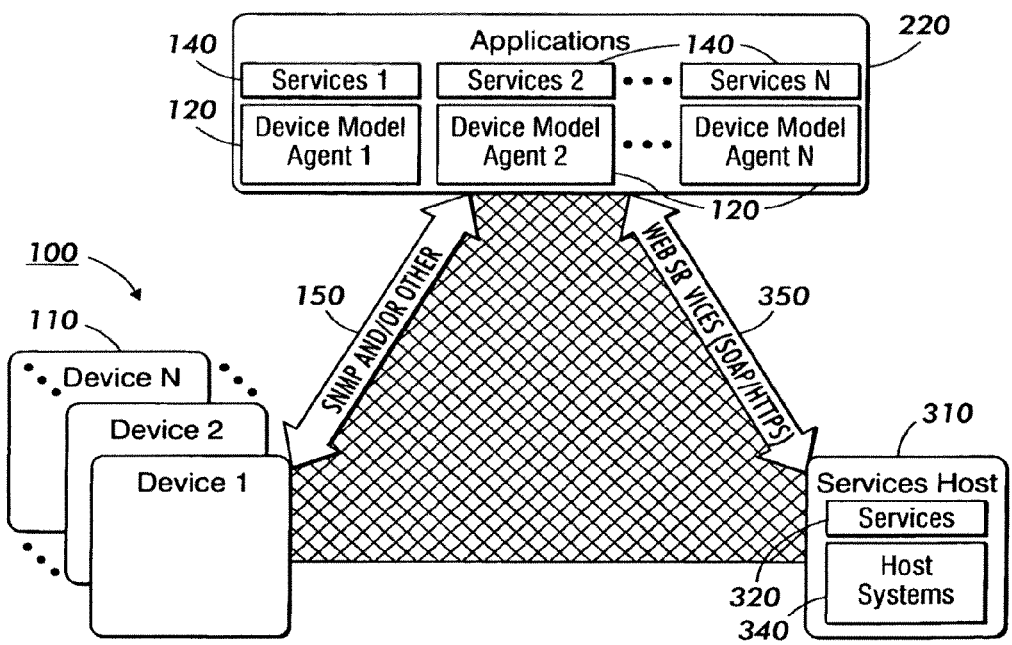
*FIG. 7*

APPARATUS FOR LOW COST EMBEDDED PLATFORM FOR DEVICE-SIDE, DISTRIBUTED SERVICES ENABLEMENT

PRIORITY CLAIM

This application is a divisional of Ser. No. 10/687,142, filed Oct. 16, 2003 and claims priority to U.S. Provisional Patent Application No. 60/319,622, filed Oct. 16, 2002, and U.S. Provisional Patent Applications Nos. 60/319,623, 60/319,624, and 60/319,625, filed Oct. 17, 2002, the entireties of which are incorporated by reference.

CROSS-REFERENCE TO RELATED APPLICATIONS

This application is related to U.S. Provisional Patent Application No. 60/319,622, filed Oct. 16, 2002, also filed as U.S. patent application Ser. No. 10/686,751; U.S. Provisional Patent Application No. 60/319,623, filed Oct. 17, 2002, also filed as U.S. patent application Ser. No. 10/687,244, granted as U.S. Pat. No. 7,647,392 on Jan. 12, 2010; U.S. patent application Ser. No. 10/686,844, granted as U.S. Pat. No. 7,734,749 on Jun. 8, 2010; U.S. patent application Ser. No. 10/686,824, now abandoned; U.S. Provisional Patent Application No. 60/319,625, filed Oct. 17, 2002, also filed as U.S. patent application Ser. No. 10/686,842, granted as U.S. Pat. No. 7,644,145 on Jan. 5, 2010; and U.S. patent application Ser. No. 10/686,843, now abandoned; the subject matter of which are incorporated by reference.

FIELD OF THE INVENTION

Embodiments relate to electroreprographic marking machines, facsimile machines, scanning devices, multifunction devices, and the like. Particularly, embodiments relate to the implementation and distribution of services such devices can offer users.

BACKGROUND AND SUMMARY

Installation of a marking machine or other business device is only the first step in the majority of its lifecycle. Most devices are involved in ongoing business processes between the product owners (users), the manufacturer of the product, and/or third party suppliers. Companies that manufacture marking devices typically include products and services in support of users' documents and hope the users will use and live with the offerings for quite a while. This post-sale period presents an opportunity for building a strong and mutually beneficial, long-term relationship between the manufacturer and the users. The post-sale relationship can be defined not only by what the devices do for users, but how they do it, how manufacturers support them, how manufacturers treat the users, and how easy it is to own and use the devices overall. Understanding this, embodiments address users' complementary needs to receive services in support of the devices they use: post-sale lifecycles, break-fix needs, and integrated business processes are addressed in various embodiments. These processes range from break-fix service (repairs), to ongoing supply of consumables and supplies, to product upgrades, enhancements, and integration into solutions and other offerings. Traditionally, these post-sale processes were manual in nature and required the device owner/user to play an active role in relaying limited information to manufacturers and suppliers at the time of need.

Many electroreprographic marking machines, facsimile machines, scanning devices, multifunction devices, and the like provide services to assist with such processes that users must learn how to use or to avoid. Some devices also require meter reads and other types of maintenance that tend to irritate users. In the case of meter reads, users may have to read the meter on a monthly basis and communicate the results to a supplier via, for example, fax or phone. Additionally, users must manually check supplies of paper, toner, and other materials and place orders for new materials. Sometimes the number of services offered by a device can bewilder a user, leading the user to believe that the device is too complex to learn. Further, to avoid down time and other inconveniences, users often would rather make their own small repairs than call for a repair and wait for service to arrive and repair their device.

With the advent of modems, high-end products in user or user sites were connected back to manufacturers via phone lines changing this interaction model. The arrival of ubiquitous Internet connectivity and the proliferation of network connected products present new opportunities to bring a more flexible and powerful approach to the integration of devices with post sale business processes. While network connectivity removes some of the drawbacks of phone line connectivity, systems described to date still carry many of the limitations that were associated with the interaction models developed for these early systems.

Disadvantages of current systems include tight coupling of communication method and system architecture, one-size fits all deployment and integration strategics, and typically no support for devices already deployed. Systems that do offer support for devices already deployed typically are inconsistent between how already deployed devices and new devices are handled. Additionally, systems typically do not include any means for rapid upgrade, extension, customization, and evolution of features, processes, and workflows and are often limited to basic business processes, failing to provide external services and solutions APIs in a consistent fashion. Generally, and almost across the board, systems treat the device as a simple repository of information, rather than an active participant in the services enabled. Devices must continue to have their mainline feature sets enhanced to stay competitive. In document systems, for example, speeds, feeds, image quality, and document workflows are typically characteristics that are enhanced to render devices competitive. However, increased post-sale interaction between devices, users, and suppliers, and the ability to integrate products into solutions and services and vice versa are becoming points of distinction between devices in the marketplace. In the near future, devices* success and value will likely be measured by the ability of devices to actively participate in their post-sale lifecycles, their ability to seamlessly integrate with solutions offerings, and their capacity for customization and extension based on user needs and requirements. The results of such device abilities are improved ease of use for the user, more effective support from manufacturers, and better overall user satisfaction.

A general industry trend for several years has been to take advantage of the increasing embedded computation and connectivity found in marking devices by offering remote services to increase user satisfaction and reduce operating expenses. This trend towards connected intelligent products started with remote services implementations on servers and other mission critical information technology (IT) related hardware and has become increasing prevalent in a variety of other industries, including marking devices. These remote services provide a win-win value proposition for both manufacturers and users. When implemented properly, these services allow for large cost reductions for the manufacturer, as well as a richer post sale experience for the user.

This transition will be driven by several coincident factors and needs. Competitive pressures and the need for improved internal business processes will require new ways of interacting with products in the field, as well as a shift in where responsibility for service and support resides. Manufacturers and users alike will prefer to be able to configure and add new features/services to products rapidly to solve immediate problems and to rapidly deploy new features. Simplifying and speeding this process will prolong the lives and enhance the value of deployed devices and will help keep users happy and productive. Manufacturers need to be able to provide these capabilities for new devices and those already deployed, but manufacturers cannot afford to be best in breed to everyone; devices must be able to easily incorporate third party or competitive elements. One size does not fit all, and multiple deployment configurations are necessary that give the manufacturer the ability to configure an appropriate solution for an individual user's needs. The manufacturer must also be able to make solutions behave consistently across multiple configurations so that they are manageable and supportable, and so the user remains in control.

Studies centered on determining user preference and need for these types of services conclusively point toward the need for new capabilities in offerings that will enhance the way users live with marking devices, billing systems, and supply chain. The studies also indicate that users desire these services and are willing to work with manufacturers to overcome security hurdles to implement them. In particular, the studies found that for nearly one third of users, these remote services would be likely to make users more loyal to a given machine brand at the time of next purchase. Most users would be willing to pay to acquire remote services capabilities on their machines are very or somewhat comfortable with sending data to services providers via the Internet, as long as they had some level of control over the data shared, and showed particular interest in directed self-repair, automated downloading of software, and remote supplies/services analyses and predictions.

In addition, an analysis of remote solutions state of the art shows that all major players in the marking device manufacture and remote solutions market offer some degree of remote service functionality and are placing increased emphasis on expanding these capabilities. In the offset printing market, integrating remote services into presses and peripherals is considered a cost of doing business.

Services offered to users prior to the instant system were assembled and managed end-to-end within specific product families. This required product teams to invest in developing not only the product itself, but also the infrastructure, services, and back-office connections necessary to get the job done. This effort was often very difficult to sustain long-term and was often duplicated across product families.

Users' experiences can be greatly enhanced by simplifying the users' relationships with devices, such as, for example, marking devices. Embodiments can automate current, manually-performed and/or non-uniform business processes, as well as providing new workflows to address evolving user requirements. This will be accomplished by, for example, employing embodiments to enable devices to be active participants in their life cycles and value added services while keeping the users in control. Embodiments do this using standards architecture, such as Distributed Management Task Force and Common Information Model (CIM) based standards, to allow services to be written once for all devices employing and/or compatible with embodiments and to enable easy modular additions of new services on a product by product basis.

To achieve these ends, embodiments provide a common service model, services that work with a multitude of disparate devices, and flexibility in physical, logical, and operational configurations. Devices take on an active role in providing users with enhanced post sale experiences. Embodiments can enjoy seamless integration into back-office processes of both users and manufacturers.

More particularly, embodiments comprise a flexible end-to-end system for connecting devices to solutions offerings. Many deployment options in various physical locations and configurations are possible to allow broadest device coverage and rapid deployment of capability for both machines in field and new products, while insulating device changes from back-office changes.

The system of embodiments can be reused across all compatible platforms, freeing individual platforms from the need to reinvent all back-office systems. Each platform team need only enable their product through one of the ways mentioned above and contemplated by embodiments, such as by embedding the DMA of embodiments and/or by complying with specific services transactions protocols.

An agent software component embedded into devices, add-on modules, and device proxies provides a common device model, common information management ^CIM) application programming interface (API), and an environment in which device services can run. A common abstraction of a communication mechanism allows the system to be independent of the physical transport linking nodes. A service model supports services that run close to the device and their lifecycle, which includes the methods and processes for effective management and customization of services and solutions. As a result, services that are once written to the agent are capable of running on any device, add-on module, or proxy that includes the agent. This yields a system that enables devices and device proxies to be deployed and work together seamlessly from the point of view of the services, as well as policy-based provisioning for device-based services with both user and supplier inputs. The embedded service agent takes an active role in solutions offerings and works in coordination with distributed solutions and/or a network-accessible server to provide required functionality. The server provides a clearing house for messages that must traverse the system and provides management functionality necessary to connect and customize distributed services at multiple levels of granularity.

In addition to increased user satisfaction and loyalty, embodiments can create financial benefits. Embodiments can provide cost savings from reduced service engineer usage through increased user self-help, remote diagnostics, and prognostics. In embodiments including automated meter reads, reduced collection process infrastructure, better contract enforcement, and reduced reserves against inaccuracies can provide additional cost savings. Further, embodiments participating in automated supplies ordering can enable decreased inventories through increased accuracy of tracking consumables at user sites, in part due to more timely, accurate, and applicable measures. Additional cost savings could be realized in terms of eliminated phone time due to fewer call-in orders and disputes. Finally, embodiments can contribute to an increase in revenue from new services since so many users would be willing to pay a fee for the services offered by embodiments.

Embodiments respond to user need and interest by including, for example, a new class of remote services. These services will capitalize on the increased connectivity of devices in the user environment, and utilize embedded computations within the devices themselves to make devices active participants in simplifying user work processes. The platform enables a standards-based solution that can be used to modularly implement remote service offerings in a cross-platform manner that all use common back-office integration and work processes. Specific examples of the types of services that can be offered in embodiments include: automated meter reads, automated supplies ordering, productivity reporting, software download, assisted user self-help, remote diagnostics, and prognostics.

Embodiments include a class of services that exist in support of the devices (printers, scanners, repositories, and even other services and solutions) and their lifecycles making them easier to own, use, support, purchase, and upgrade. Market research has shown that these services increase the value of devices to users and can potentially also increase their user satisfaction over the life of the product. This in turn should translate into higher user loyalty and consideration from our users when making new purchases.

These services, in embodiments, make use of new device capabilities including embedded device intelligence, take advantage of the increasing networked population, and exploit information technology advances enabling devices to take a more active role in their post-sale life cycles enabling automated and expanded feature sets.

Embodiments provide the underlying set of components and their interconnections that enable suppliers to deliver these types of post sale services to users in an effective and efficient manner. The high-level goals defined for the platform have been used to drive the architecture and development of initial components and services. The detailed attributes of each support the four major goals for the platform. The major components of this system all work together behind the scenes to make the services offered behave seamlessly for users.

Embodiments provide for automated reporting of meter reads via phone, fax, or computer network. Additionally, embodiments automatically monitor supplies, warning users when supplies are low and allowing automated ordering of supplies then and in subsequent similar situations. Additionally, the services a device offers can be tailored to the users' particular needs, but can later be augmented or reduced as required by the user via automated service subscription, downloading, and installation offered by embodiments. Further, embodiments walk users through any operation they wish to perform, including small repairs and replacements of user replaceable units. An additional advantage of embodiments is the ability to manage assets of multiple devices from a central application.

Embodiments implement an add-on component or CS Platform that is an initial embodiment of a class of add-on system components that provides connectivity, service deployment and management, and device management for legacy devices at significantly reduced cost. It enables this by reducing the cost of UI and greatly enhancing ease-of-use by realizing that the networked system could be headless and use a browser-based UI for this platform.

Additionally, embodiments embed the DMA technologies and connect to the Device-Centric Services platform to offer services at no additional cost. Offering customized diagnostic access for trained customer representatives to enable self-help service actions to be performed.

Unifying and managing multiple access needs to several disparate data access mechanisms into one physical entity using largely COTS PC hardware rather than customized PWBs and making it easy to upgrade over time.

Architected as a system component suitable for use in any system configuration. Providing a platform for continuing assisted-self help service offering extensions over the life of the product family.

Architecting the CS Platform to enable it to be easily reconfigured for use on other platforms if desired. Providing device-centric services such as remote monitoring, automated billing, and supplies replenishment (to name a few).

BRIEF DESCRIPTION OF THE DRAWINGS

FIG. 6 is a schematic illustration of an additional deployment option according to embodiments.

FIG. 7 is a schematic illustration of an additional deployment option according to embodiments.

DESCRIPTION

Figure 1:
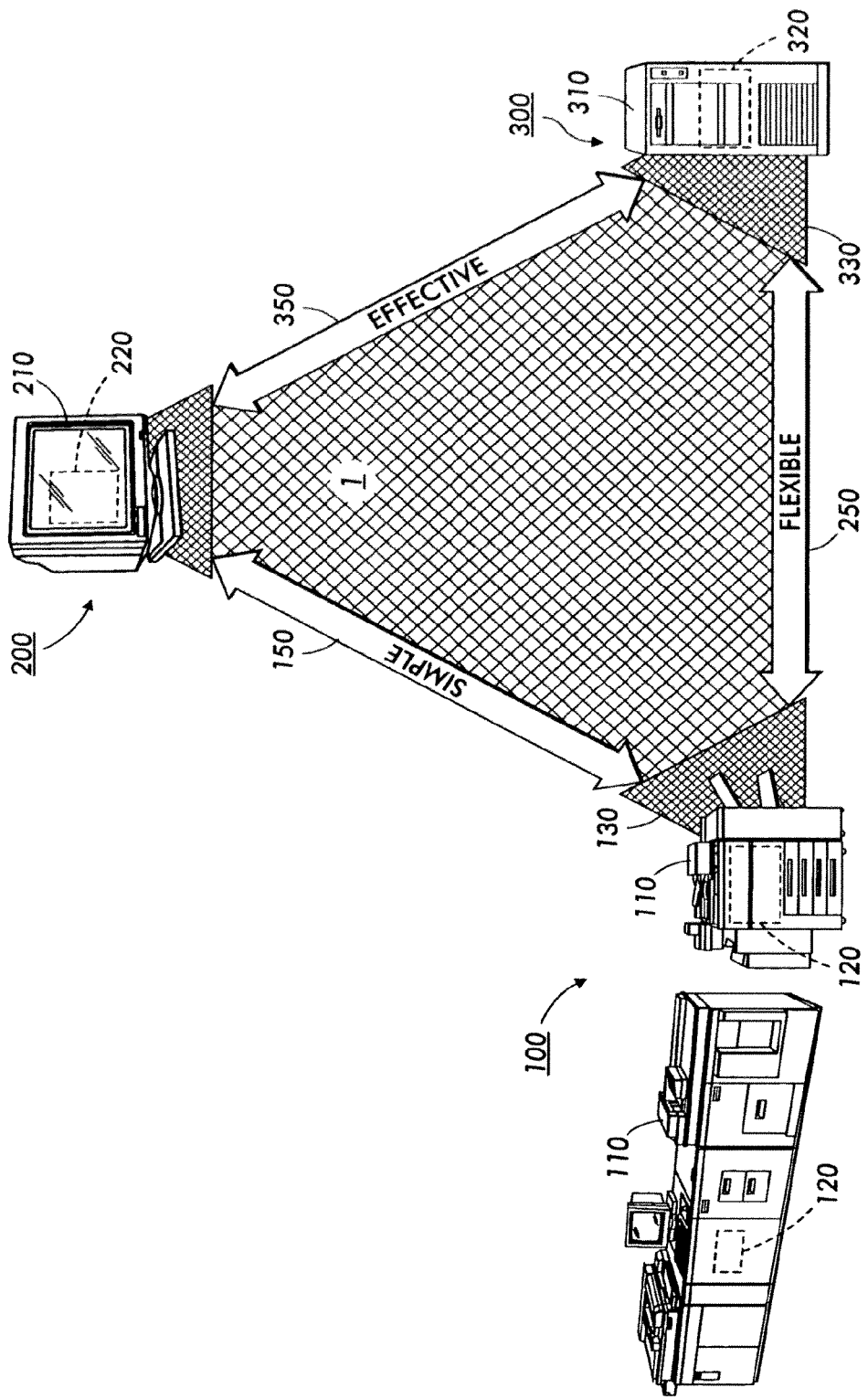
FIG. 1 is a schematic illustration of the overall architecture of embodiments.

For a general understanding of the present invention, reference is made to the drawings. In the drawings, like reference numerals have been used throughout to designate identical elements.

Embodiments provide a system 1 (FIG. 1) composed of several types of distributed software and hardware components that ensure physical and logical system design flexibility and responsibility of the components. Embodiments employ an architecture including, for example, devices 110 in the user/user environment 100, an asset management system 200 that can be in the user's network or environment 100, and a services host 310 that provides services 320 to which devices can subscribe. System management and services are provided in a system where devices are active participants in both their own services and lifecycle needs as well as those services and lifecycles in which they are only a part.

Using the Device Model Task Force (DMTF) Common Information Model (CIM) as a base, service management is added to the active behavior of a Common Device Model Agent (CDMA) 120. See particularly, for example, FIGS. 1 and 10. Each device 110 is preferably represented to the services host 310 by a CDMA 120 that communicates the status and configuration (part of 111) of its device 110, services 140 offered, and other information (additional parts of 111, for example) to the services host 310 using a common transaction language, such as DMTF CIM, for example. The DMA also provides a services environment 124 that is a runtime environment for services 140 on the device in which it resides, providing device-independence for the services offered by the services host 310. Thus, a particular service 140 can be written once and run on a wide variety of devices 110. This allows One to Many configurations, which can be enabled, required, and utilized as necessary. For example, embodiments can include device proxies, including simple proxies that include only behavior, and proxied device models, as will be expanded upon below. Also, embodiments can include devices that communicate directly with the services host.

The CDMA 120 includes the services environment 124, a CIM API 123, a CIMOM 125 and service manager 126 in the core DMA 122, and a common provider API 121. The common provider API 121 communicates with device-specific provider APIs 112 of the device 110 and retrieves information 111 about the device, including, for example, its configuration, status, and supplies levels. The common provider API 121 then makes such information available to the CIMOM 125 and service manager 126 in the core DMA 122, and services 140 running in the services environment 124. Thus, in embodiments, the DMA 120 can reside between a services layer 141 (the collection of running services 140) and device-specific APIs 112 and can communicate directly with the services host 310. In such a case, the DMA 120 must be connected to a communications medium, such as a telephone line or computer network, to enable communications with the services host 310.

Partly as a result of the use of the DMA 120, the system 1 in embodiments achieves substantial communication medium independence. Devices 110 can communicate with the services host 310 and or service proxy via network, land phone line, cellular communication, packet radio, pager based, Bluetooth™, IEEE 802.11, or any other suitable communications scheme. Such communications can be device initiated, host initiated, can be monitored and/or audited, and can use user preference, service offerings, and overall quality of service to determine which selections are appropriate for a particular scenario. The services 140 can be independent of device configuration; specifics of service content can be provided by the back-office or supplier 300, with service subscriptions being issued and validated by back-office business processes, allowing rapid introduction of new services.

Embodiments thus include an end-to-end system 1 assembled from many components using a unique combination of modularity, distributed computation, service models, and transactions. Embodiments employ an overall system architecture that supports rapid and flexible deployment of services in a modular fashion. Advantageously, this architecture employs abstraction of functionality and identification of system elements, common interfaces, and messaging models for communication between them. For device services, there are four main entities that can work together in a consistent and flexible manner: the devices themselves; management and service applications in the user's environment; back-office servers specializing in service management and service configuration; and business process integration servers and the business processes surrounding those services.

FIG. 1 shows a schematic representation of major components that can comprise the platform represented by embodiments. A small footprint embedded service platform 140 and intelligent agents 122 combined into the DMA 120 can be deployed and integrated with devices 110. Intelligent proxies for devices 110, enabling group management and participation in services, can be included in the platform, either as standalone applications or as part of other applications. In addition, such intelligent proxies can enable legacy devices that are not themselves already enabled to interface with aspects of embodiments. A medium independent communications and applications infrastructure connected to a computer network or other communications network, such as the Internet and supplier intranet, is employed that can securely and robustly connect fielded devices and products to the supplier and its internal systems. Additionally, embodiments include a set of industry standard web services technologies integrated with value-added extensions to enable those services. Embodiments thus provide set of services that run in and on an end-to-end system that support devices.

Devices 110 are typically physically located in user sites 100, though embodiments can accommodate devices 110 on other sites as well, and can be distributed around the world. A variety of devices 110 ranging from low-end products to high-end systems can be included. Embodiments use devices 110 that provide, for example, three main enablers in this system. Devices 110 provide a Common Device Interface (GDI) and a Common Information Model (CIM) 123 to enable easier integration with services by hiding device specific differences behind the interface. The CDI can be implemented in the CDMA 120 as the Common Provider API 121. This enables service reuse and greatly reduces the complexity of the system 1. The CDI is specified via a Distributed Management Task Force (DMTF) CIM with service-provider and/or manufacturer specific extensions for services and service management. The CIM 123 can also be based on the DMTF CIM with specific extensions better suited to devices with services, including diagnostics extensions, that can be provided by service-providers and/or manufacturers.

Devices 110 in embodiments of the inventive system 1 provide, for example, an embedded service platform 124 allowing services 140 to be delivered and run close to the device 110. The embedded service platform 140 also provides for local management of services, via service manager 126, and the ability to accept newly deployed services 140 asynchronously with software releases for the hosting platform. This reduces system complexity and speeds deployment of new or refined services to the field. Preferably, in embodiments the DMA 120 provides the embedded services platform 124, though other systems could provide the platform. The DMA is preferably a software module that enables the embedded computational power, data, and functions of the device to be accessed and used in services that are deployed in a common fashion.

Figure 12:
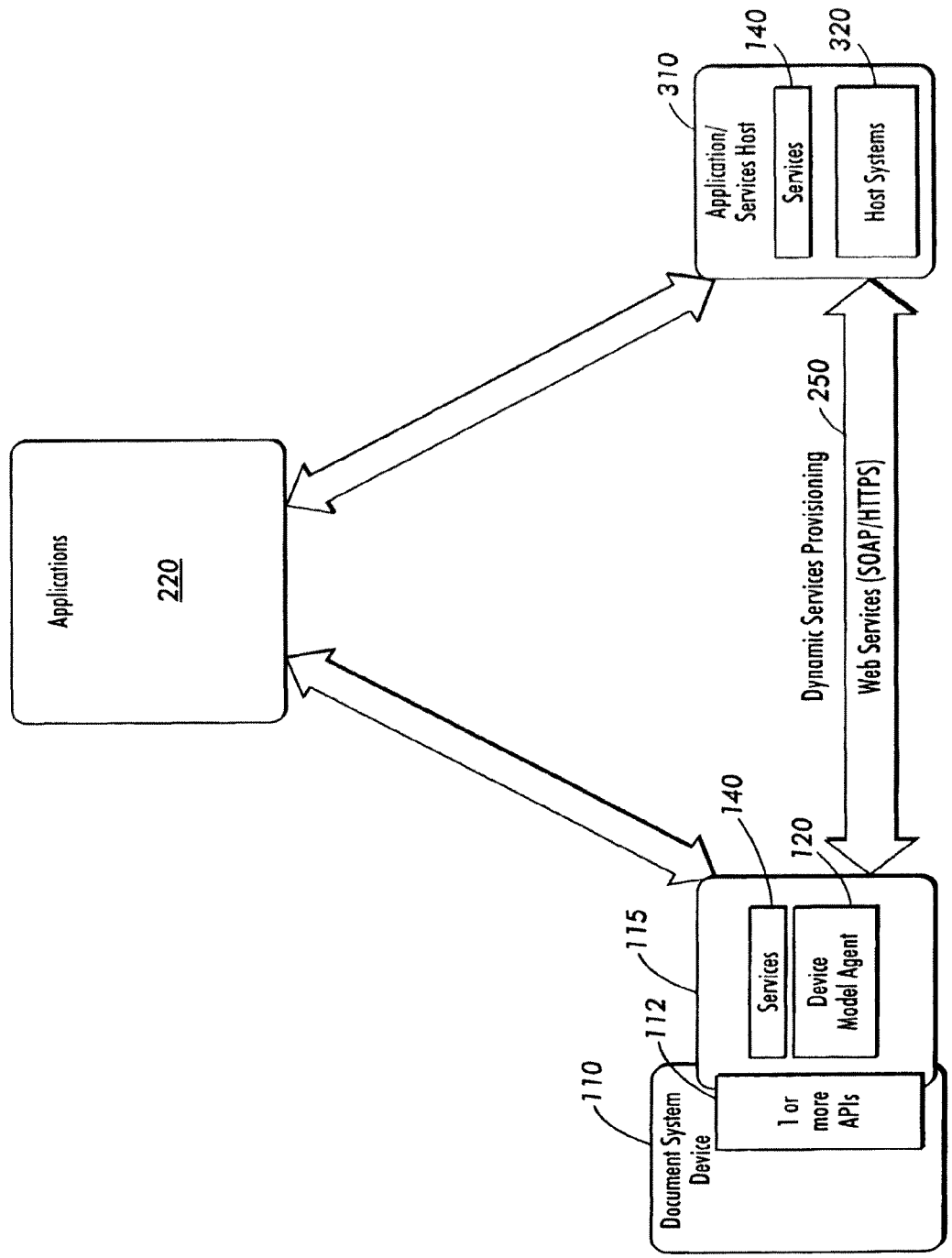
FIG. 12 is a schematic illustration of an additional deployment option according to embodiments.
Figure 17:
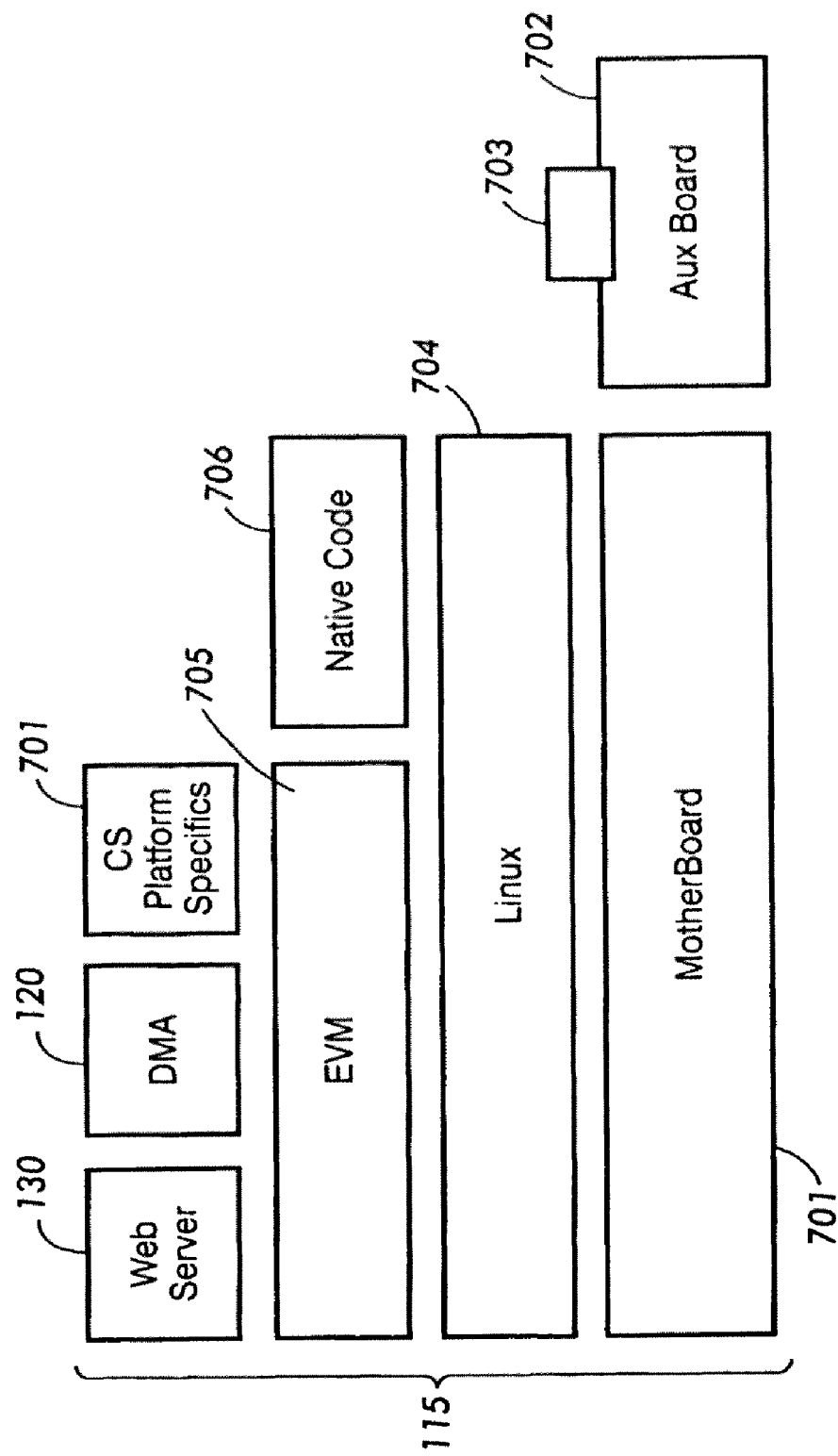
FIG. 17 is another schematic illustration of a CS Platform add-on component according to embodiments.
Figure 18:
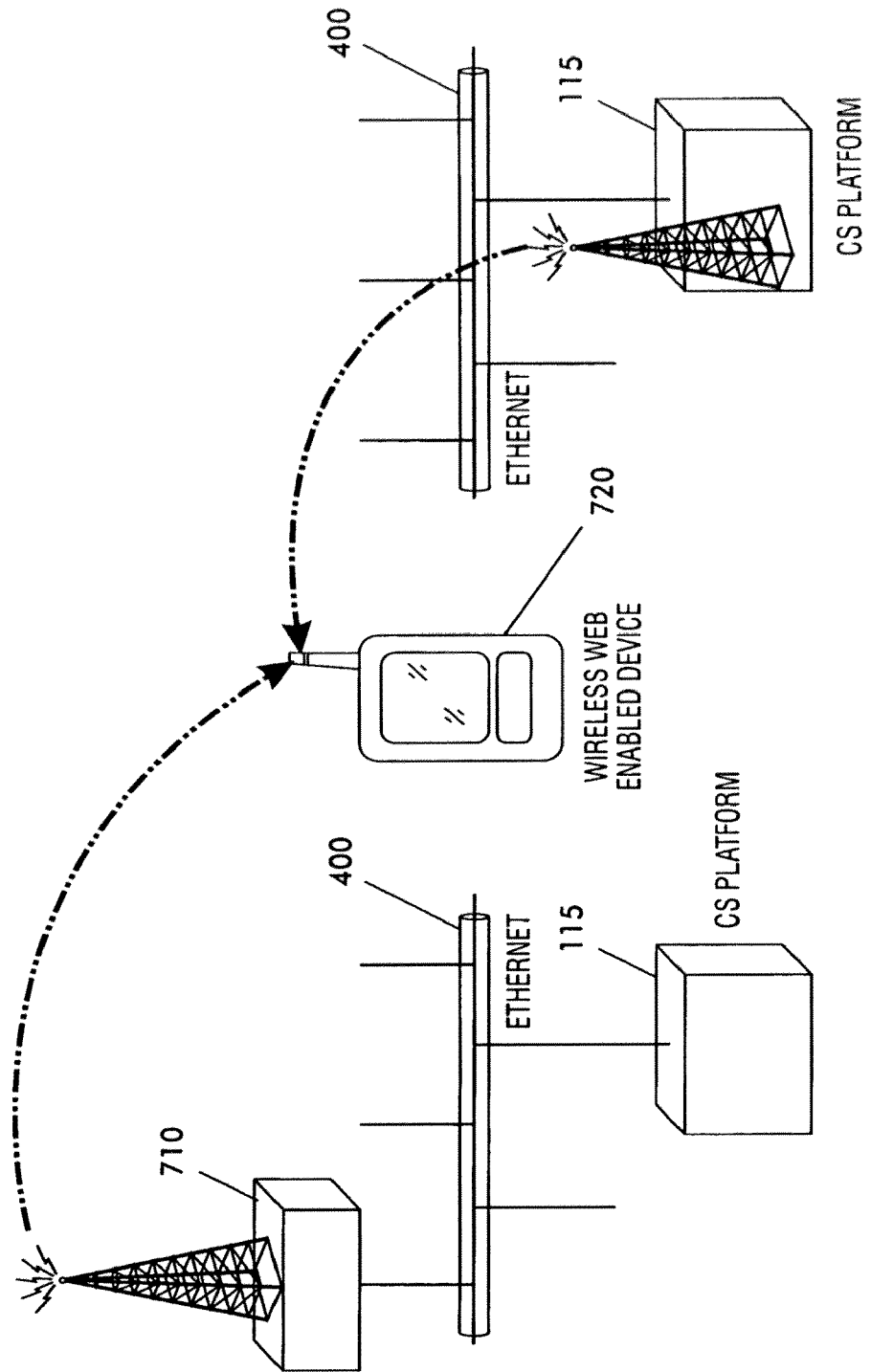
FIG. 18 is a schematic illustration of a wireless deployment scheme of a CS Platform add-on component according to embodiments.

These components will typically be distributed across the user's environment 100 as well as at the supplier 300. Together, they provide a flexible end-to-end system 1 for connecting products (such as devices 110 and services 140) to post-sale solutions offerings (additional services 140). The system 1, in embodiments, is designed to provide an architecture in support of a series of deployment options in various physical locations and configurations. Preferably, embodiments provide the broadest device coverage and most rapid deployment of capability for machines in the field and new products in such a way that isolates changes at the device 110 from changes at the back-office 300. Embodiments further provide a unique, value-added, agent software component, the DMA 120, embedded into devices 110, add-on modules 115 (as shown in FIGS. 12, 17 and 18), and/or device proxies 210 that provide the common device model 122, DMTF CIM API 123, and new device services environment 124. Additionally, embodiments can provide a common abstraction of the communication mechanism(s) that allows the system to be independent of any physical transport linking the nodes (devices to supplier systems, etc.), providing greater flexibility and deployment customization based on user requirements. The service model of embodiments supports services that run "close to the device" and their lifecycle, which includes methods and processes for effective management and customization of services and solutions. Services in embodiments once written for the DMA 120 can run on any such enabled device 110 or proxy 220, and devices and device proxies can be deployed and work together seamlessly from the point of view of the services. Provisioning in embodiments can be accomplished on a policy basis for device based services based on both user and supplier supplied information, and services can be made available with rapidity.

The DMA 120 in embodiments takes an active role in solutions offerings and works in coordination with the distributed solutions. These distributed device agents 120 work together with a server 310 at the supplier 300 accessible over a network, such as the Internet or a telephone system. The server's role is to provide a clearinghouse for messages that must traverse the solution and to provide management functionality necessary to connect and customize the distributed services at multiple levels of granularity.

For devices 110 already deployed that do not include this functionality, an option to add a physical system component 115 (as shown in FIGS. 12, 17 and 18) to the device 110, internally or externally, that enables this functionality is provided by embodiments. To the inventive system 1, a device 110 enabled in this fashion will look no different than a device 110 with the capabilities embedded, as long as the add-on component 115 has a rich interface to the device 110. For example, embodiments including such an add-on component 115 can have the component mounted on the input-output terminal (IOT) of a marking machine, connected to the IOT via EPSV, PWS, and potentially CAN Bus interfaces, and connected to a network. This configuration gives the IOT the capability to participate in device services 140. These addon components 115 can then be found in a one to one mapping with the device because of the need to access non-standard, or non-network accessible APIs and interfaces in order to offer the full range of device capabilities to the DMA and services platform.

In order to accommodate the fact that the input output terminal (IOT) may come from another manufacturer and that a user can choose from many digital front ends (DFEs), embodiments feature an add-on system component. This add-on component can be, for example, a low-cost, embedded personal computer platform running an operating system, such as Linux or Darwin, and a Java Virtual Machine, such as, for example, Insignia's Jeode™ Embedded Virtual Machine, within which runs the DMA services platform. This add-on component can connect directly to the IOT through an interface, such as EPSV and PWS. The device is then also connected the user's internal network.

The devices management and service applications 220 in the user's environment back-office servers specializing in service management and service configuration business process integration servers and the business processes surrounding those services. The schematic representation of these system level components and their interconnections are shown in FIG. 1.

Embodiments specifically relate to the role of devices in end-to-end system management and post sale application architecture and in offering services to users. The Device Model Agent (DMA) 120, the device side technology module in Device Centric Services (DCS) platform, is the main focus of this invention. DMA is a thin, efficient applications/services execution environment. The DMA provides a flexible, extensible, dynamic services management system allowing e-services to be designed, added, and managed within system without modifying the platform itself. While this invention specifically describes the integration of benefits from DMA into document system devices, the concepts are equally applicable in other domains. The DMA runtime environment is a thin software interface layer that resides on a document system device between the Java runtime environment and embedded web server.

The device model agent as described herein adds the following capabilities to document system devices. The unique combination of these capabilities enables several benefits related to system management application development, deployment, and maintenance.

Figure 13:
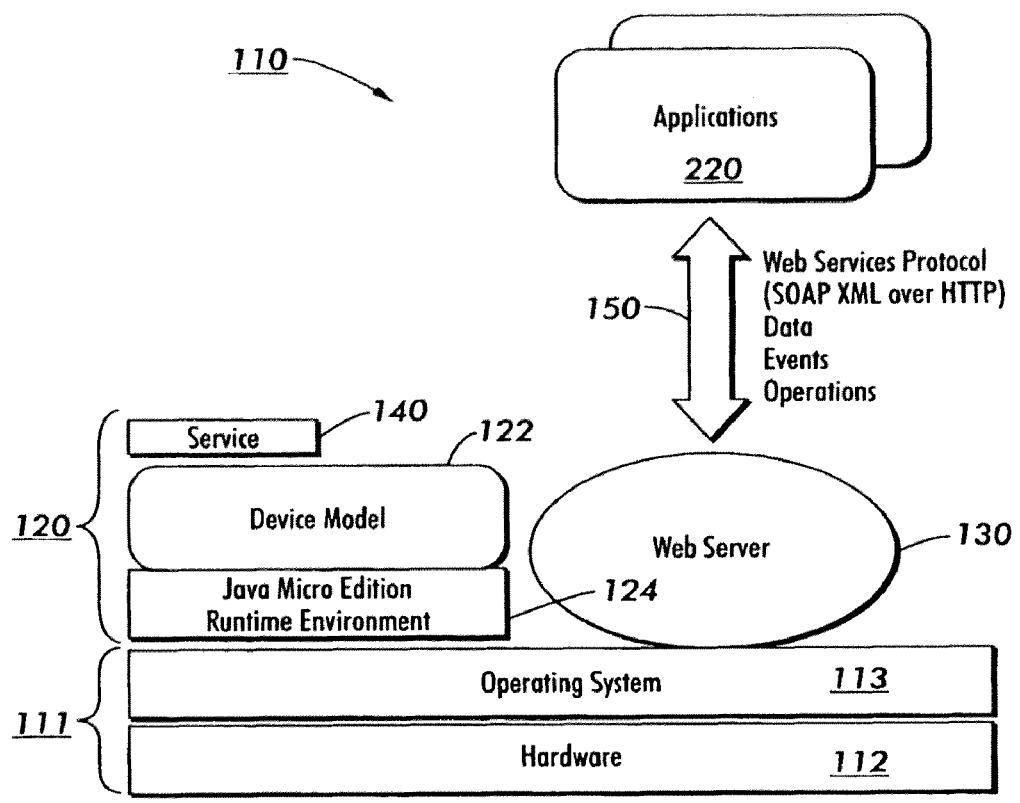
FIG. 13 is a schematic illustration of an additional deployment option according to embodiments with more emphasis on the Device Model Agent and its relationship to a device.
Figure 14:
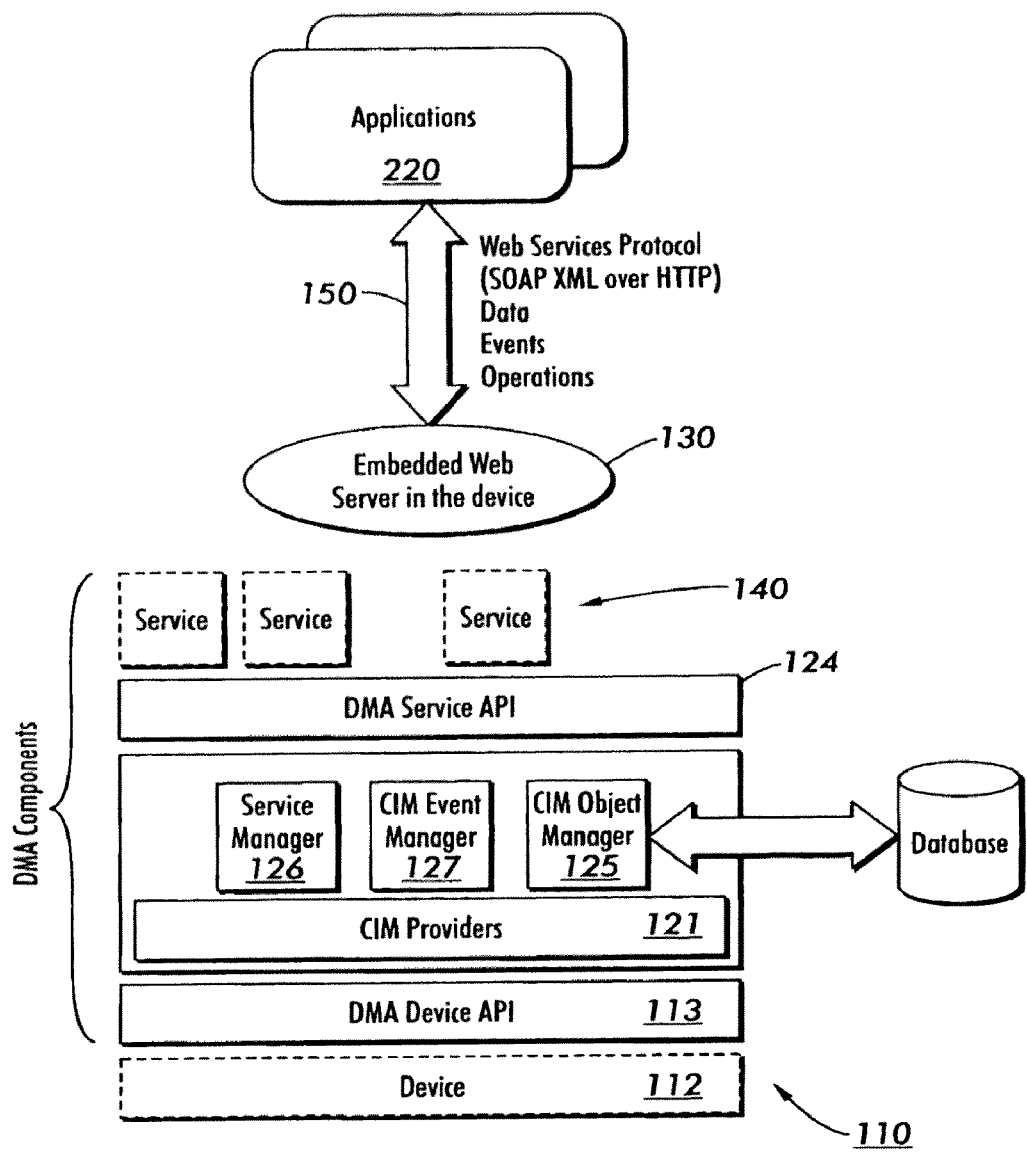
FIG. 14 is a schematic illustration of an additional deployment option according to embodiments with more emphasis on the Device Model Agent and its relationship to a device from another perspective.

The DMA 120 enables active participation in applications and services offerings, such as, for example, post-sale, system management, and other services. The devices 110 that embed DMA 120 can perform several computational tasks required in system management applications and services. In this architecture, an application server 200 installed, for example, in the user environment 100 or supplier 300 back office server 310, and the target device 110 collaborate to complete system management offerings. As shown, for example, in FIGS. 10, 13, and 14, the DMA 120 provides a service execution environment 124 where a service 140 may run as a whole or be part of a system management application or host system 320 running on an application server or host system 310 of a services supplier 300.

The DMA services preferably can monitor device events and take prescribed actions. The DMA 120 can preferably publish data to subscribers/users upon occurrence of an event of interest and can preferably invoke methods, such as diagnostic routines, on the device 110 as directed by internal or external clients or users. This moves device specific processing closer to the device 110 from a centralized application server 320. The role of the applications server 320 transforms from a computer platform for execution of applications/services to the management and configuration of applications/ services 140. Thus, devices 110 become active participants in the process, as opposed to being passive data repositories in strict client/server architectures.

The DMA 120 according to embodiments can also perform dynamic updates of services 140 and support components operating within the end-to-end DCS platform 1. Devices 110 that employ the DMA 120 can add new service components 140 dynamically. It allows a user or application component already on the device 110 to request such additions to support services 140. It can also allow the addition or deletion of components as needed and without system or DMA recompilation or restart. In embodiments, the target device 110 itself initiates the additions of a new or upgraded service as a whole or as supporting components for existing services. Thus, in the system 1 described herein, the device 110 can now be responsible for initiating the activity to maintain itself and system management services running on it.

Embodiments additionally recognize the need for an application/services execution environment 124 to enable developers to work with consistent and standards-based tool set. The DMA 120 enables the development of device independent post-sale applications 140. Applications 140 written using DMA 120 interfaces do not have to change to accommodate new or upgraded DMA enabled devices. While the DMA 120 implements a model-based approach espoused by DMTF for achieving device independence for applications/services, it adds to this implementation a new component called the service manager 126. The service manager 126 is primarily responsible for controlling service 140 lifecycle of each service 140 activated for the device. In addition, the service manager 126 preferably manages the services 140 and provides a programmatic interface (an API) for system management clients, local or remote, for control and management of services 140.

Operating within the end-to-end DCS platform 1, DMA-enabled devices and DCS application servers allow services provisioning and management by an application server or hosted systems 320 on a services host 310 of the supplier 300 or by a third-party service provider. The DMA-enabled devices 110 and application servers 320 collaborate to provide dynamic provisioning. Using this system, users can review a set of applications, select or customize one or more applications to fit their needs, and order the selected set. Subsequently, the applications can be installed, enabled, turned on, monitored, and/or managed.

Figure 11:
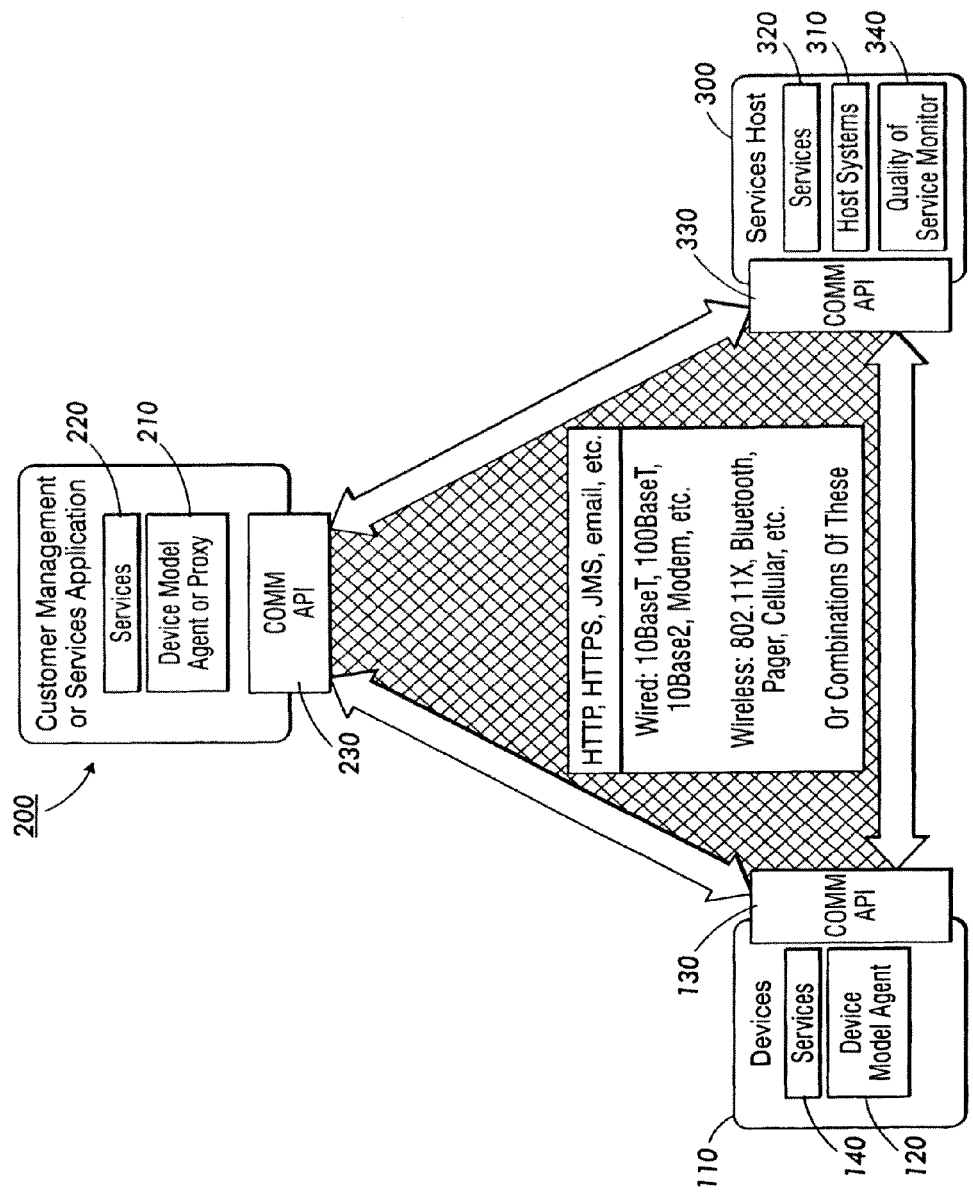
FIG. 11 is a more detailed schematic illustration of the interaction between devices, the device model agent, services proxies, and the services host according to embodiments.

In order to cover new and existing device base, the architecture of the DMA 120 in embodiments allows its deployment in several ways: For example, according to embodiments as shown, for example, in FIGS. 4, 9, and 11, the DMA 120 can be embedded in a networked device 110, such as a printer or multifunction device. In this embodiment, the DMA 120 becomes a web server side component. The DMA 120 can, for example, use Java Servlets, a standard method for hosting service-components behind a web server.

Alternatively, the DMA 120 can be embedded in a specialized hardware device or add-on component 115 to devices 110 that are standalone, such as copiers, or for existing devices in field that are not able to ran the DMA 120. Such add-on components 115 are shown schematically in FIGS. 12, 17 and 18, and will be discussed in more detail below.

Another alternative configuration is for the DMA 120 to be embedded in a network application 220, either as a single device proxy or multiple device proxy configurations. Such proxy configurations are illustrated, for example, in FIGS. 7, 8, and 11.

For any device manufacturer, post-sale applications can be important for continuing user loyalty. In case of the supplier of marking and/or multifunction devices, sale of a document system device is just the beginning of the user relationship. Continued service, support, supplies replenishment, and on-going maintenance become the main considerations that determine user retention rate. However, as mentioned earlier, the development, deployment, and management of post sale applications in a cost effective fashion itself poses several challenges. The complexity is driven by the presence of multiple stakeholders, including developers, device manufactures, service owners, and customers/users. As a platform, the DMA 120 is preferably designed, according to embodiments, to bring all major stakeholders together and address the requirements of all stakeholders.

The DMA 120 preferably constructs a layer of abstraction between device specific interfaces 111 and system management applications. See, for example, FIGS. 10, 13, and 14. The abstraction provides a common view of device data, event, and operations to system management applications. The DMA 120 adopts a model-based approach to create device abstractions. The device models used for this purpose are based on industry standard efforts in DMTF (Distributed Management Task Force) consortium. An enhanced version of DMTF Common Information Model (CIM) is used as a basis. However, the implementation of common model with device interface is unique. Interactions between post-sale application clients and DMA are based in DMTF CIM Operations Over HTTP specification.

The DMA 120 enhances a DMTF/CIM implementation by adding a service manager component 126. The service manager 126 is responsible for loading services-140, maintaining a list of services 140 currently installed in the DMA-120, and management and lifecycle control of services 140. The service manager 126 preferably works as an automated process and can automatically look up and start services 140 as a standalone component that can be accessed programmatically or through a DMTF CIM API 123. The service manager 126 can provide access to active services 140 on the device 110, as well as management data for one or more active services 140.

The DMA service manager 126 preferably supports core services that are started automatically when the service manager 126 loads. Such core services preferably do not require provisioning support. The service manager 126 also preferably supports subscribed services 140 that require enablement through a dynamic provisioning feature of the DMA 120.

Figure 15:
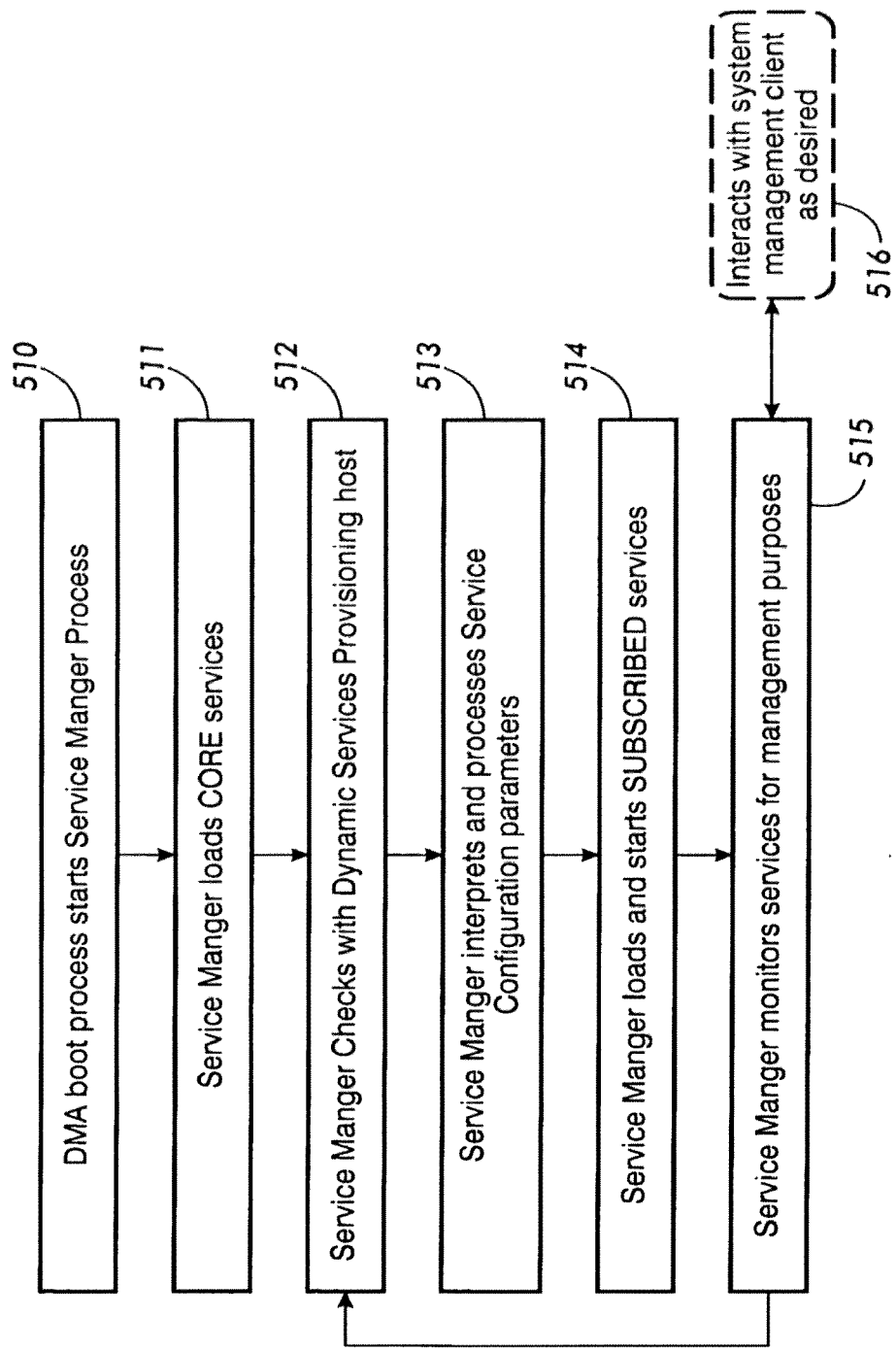
FIG. 15 is a schematic flow chart of a method of operation of a service manager of the Device Model Agent according to embodiments.
Figure 16:
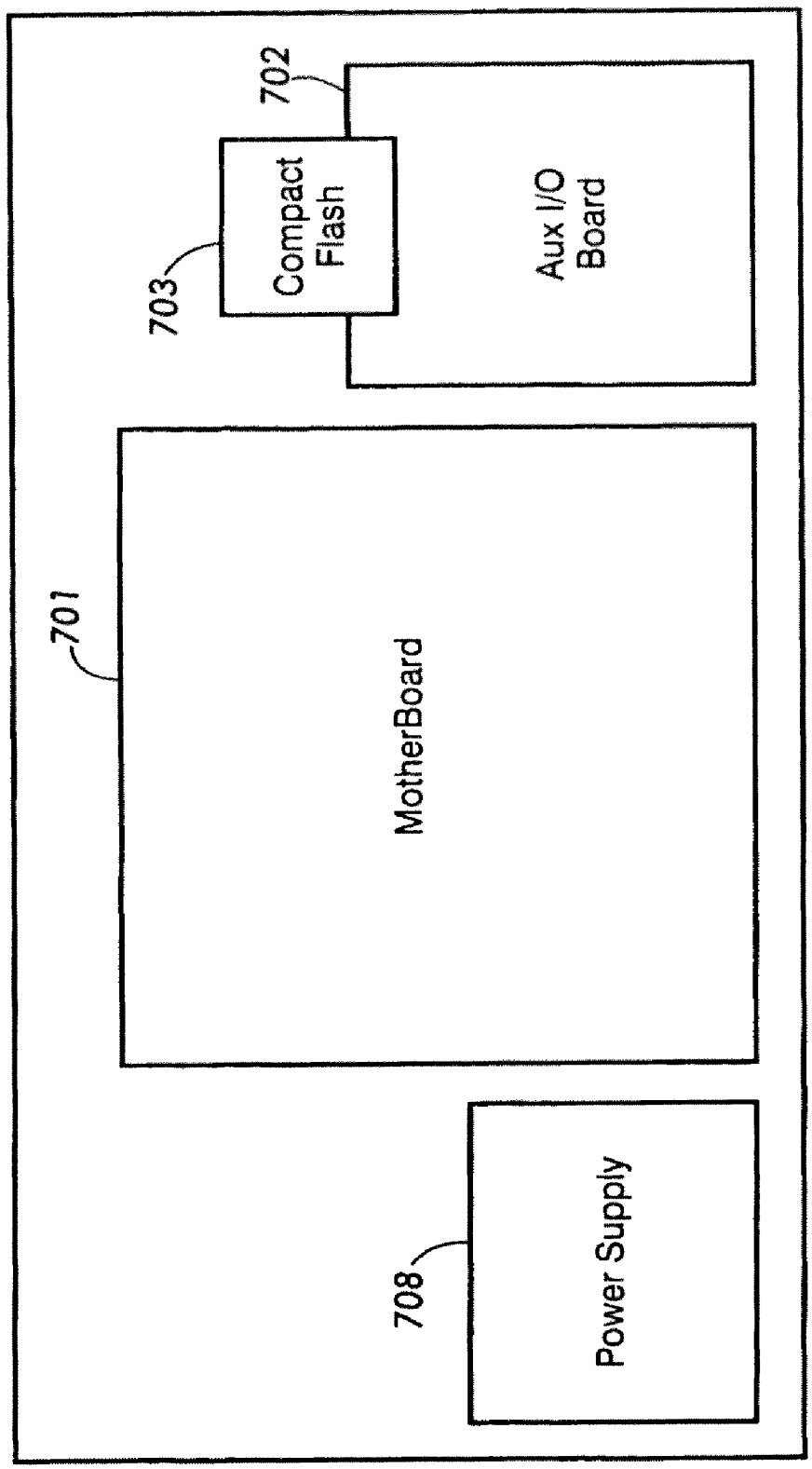
FIG. 16 is a schematic illustration of a CS Platform add-on component according to embodiments.

FIG. 15 is a schematic flow diagram that illustrates the service manager 126 startup and normal execution. When the DMA 120 boots, it starts the service manager (block 510). The service manager 126 then loads the core services (block 511) and checks with the dynamic services provisioning host (block 512). The service manager 126 further interprets and processes service configuration parameters (block 513) and loads and starts subscribed services 140 (block 514). The service manager 126 then monitors the services 140 for management purposes (block 515) and interacts with a system management client as desired (block 516).

The DMA 120 is preferably written using a substantially platform-independent language, such as, for example, Sun's Java 2 Micro Edition (J2ME). The DMA is thus highly portable and can be used as a system component in any system configuration where Java is available.

Management and services applications 200, according to embodiments, can be located in the user's environment. Some applications 220 can enable the offering of device services by, in part, behaving as a services proxy for devices 110 that are networked but not fully enabled to participate actively in device services by themselves as shown schematically in FIG. 7, for example. In other words, the applications 220 can act as proxies for networked devices that do not have the DMA 120 or the software to support the service offerings 140 directly. For example, some applications, such as Xerox Corporation's Centre Ware Web® (CWW), can act as device proxies for Simple Network Management Protocol (SNMP) enabled devices. To the extent that the SNMP agents in the devices deliver the required data and functionality to support the services being offered, this can be a good way to bring devices into the services fold. In such a case, the application, such as CWW, assumes the responsibility for hosting the services 140 that run close to the device 110.

To the back-office or hosted portion 300 of the end-to-end system 1, such as the services host 310, the device 110 looks nearly the same when proxied via applications 220 as it would if the device communicated with the services host 310 directly. The difference between proxied devices and direct devices is substantially no different than the differences associated with direct devices with different levels of firmware. The device capability variations can be managed on the back-end/services host 310 via a provisioning system for device-based services. The impact of these variations is that advanced services utilizing very specific capabilities of a given device become less portable; that is, services written for product specific sections of the CIM extensions will not be completely portable and may not be as compatible with other devices. However, services written to the Core and Common models will remain portable, and deployment issues will be managed by the provisioning system.

The applications 220 can also behave as services proxies for devices that are not networked directly, but have an add-on connectivity option. Such a connectivity option can be hard wired, such as Ethernet, or wireless, such as Bluetooth™ or IEEE 802.11, and can be local or more expansive in its coverage. For example, a stand-alone copier with no network connection for printing can have a small wireless LAN connection has been added, such as an 802.11b or other wireless network. The proxy behaves in all the same ways as when a networked device without DMA is proxied, but the proxy now also includes the hardware required for the wireless access point used to communicate with the devices to which add-on connectivity has been attached. An example of such a system would be CWW installed on a server that is both physically networked on a LAN and also has a wireless access point attached. To the back-office edge host 310, the devices 110 proxied in a wireless fashion look no different than those proxied on the LAN.

The applications 220 can also enable consolidated management of services from a server in the user environment. Device proxies can provide, in embodiments, an aggregation and group management function for services associated with their proxied devices. This can, for example, be a graphical user interface (GUI) for a system administrator or user to look at the status of services on a set of devices.

The common device interface of services and their transactions to the back-office systems, such as services hosts 310, can be an extension of the interface used on the devices themselves. This enables the services to work for both direct to device situations and situations in which devices use proxies. The API from a device directly communicating with the services host is supported, along with a limited set of specific device proxy extensions that deal with transactions and data related to the proxy. All transactions aimed at the devices should look the same.

Figure 2:
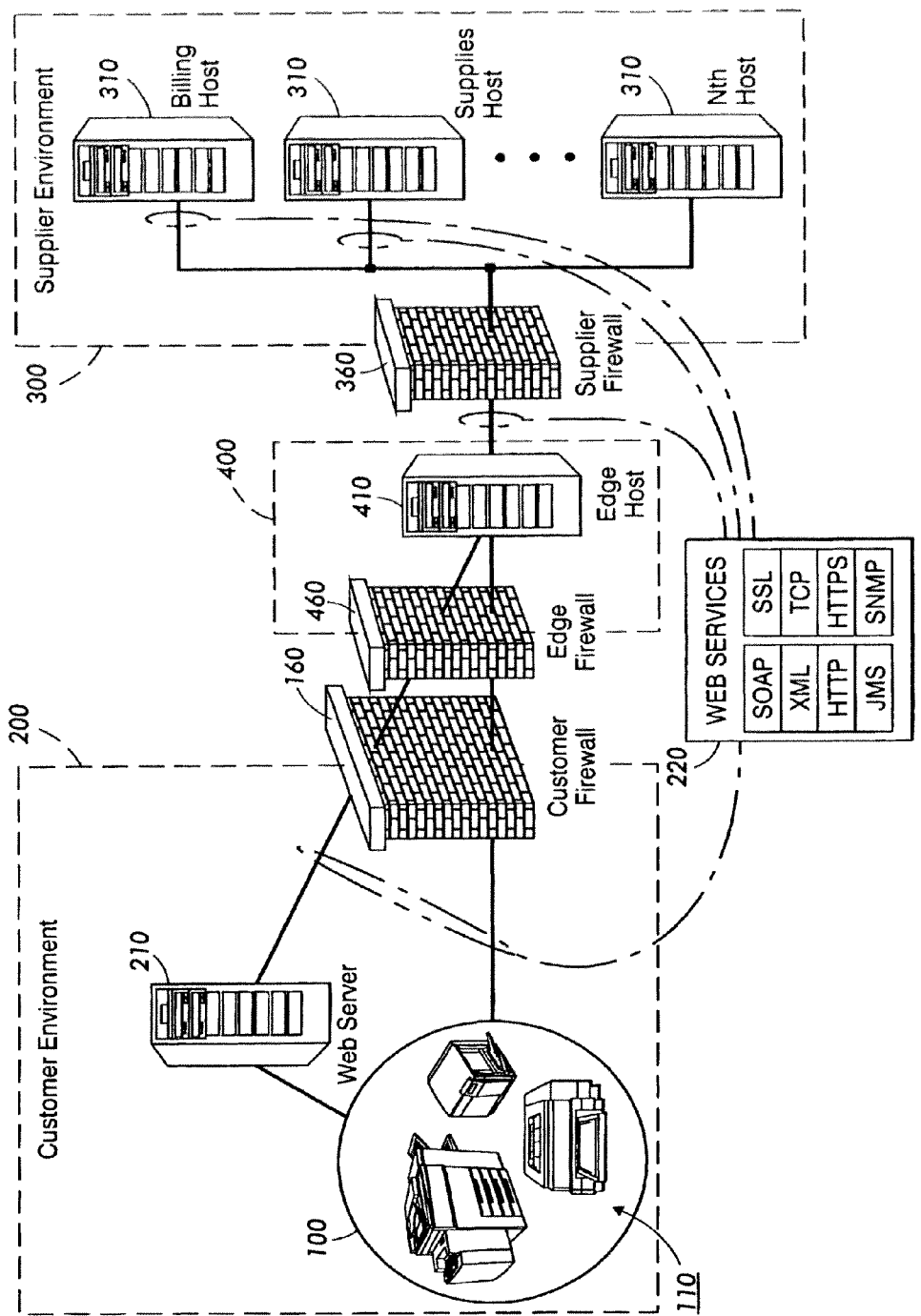
FIG. 2 is another schematic illustration of the overall architecture of embodiments.

With reference to FIG. 2, additional portions of an exemplary embodiment are described. The hosted portion of the services, the services host{s) 310, can be located off the user's site 100, 200, and can be located at the manufacturer's or other service providers' facilities 300. A device services edge host 410 handles the transaction and service management for the device services deployed to the field. This includes the management of message queues and provisioning of software modules and configuration parameters in support of the distributed services 140. The edge host 410 is also responsible for the host end of the security and service models employed by the device services system 1.

The edge host 410 also provides connections to service sponsor systems 310. This connects the external device services world to the internal (or third party) services world. The connections to each of the organizations sponsoring the services are maintained through the edge server and can be compliant with security rules and regulations of the entity maintaining the server and host. The edge host insulates the device 110 or device proxies 220 from having to have direct knowledge of the details of interaction with the back-office complexities of the services involved on the services host 310. This insulation is advantageous in deploying device services in a manageable and robust fashion. Preferably, embodiments present a common services API to the back-office sponsor organizations in order to standardize the basic operations. Specific services can extend and customize the content of the transactions for a given application.

With continued reference to FIG. 2, the devices 110 and user applications 220, such as CWW, can be located in the user's environment 100, 200. This can be a managed services environment as well as a regular user environment. Services and communications are distributed and span from the user's internal systems and network 100, 200 across the Internet or other suitable long-distance connection mechanism 400. Well known web services, as well as future web services, comprise preferred communications mechanisms 130, 230, 330 that are preferably used between the devices/application(s) 110, 220 and the edge host 410, as well as between the edge host 410 and internal services providers 310. The system 1 is preferably built to meet basic IT industry and other standards for its ability to work with existing firewalls both on the user's side (firewall 160) and on the service provider side (firewall 360). No special configuration of the user's firewall 160 is required in order to make this system work properly.

The service supply system 300 is preferably part of the basic supplier infrastructure to provide a robust, well-managed, 24×7 level of service and disaster recovery for all user systems to employ. As indicated above, an edge host 410 can handle the transaction and service management for the device services deployed to the field. This includes the management of message queues and provisioning of software modules and configuration parameters in support of the distributed services. It is also responsible for the host end of the security and service models employed by the device services system. In embodiments, the edge host also connects the external device services world to the internal (or third party) services world. The connections to each of the organizations sponsoring the services are maintained through an edge server and are preferably complaint with supplier security rules and regulations.

The edge host 410 preferably, in embodiments, isolates the devices or device proxies from having to have direct knowledge of the details of interaction with the back-office complexities of the services involved. This isolation can assist in deploying device services in a manageable and robust fashion, A common services API is presented to the back-office sponsor organizations in order to standardize the basic operations. Specific services can extend and customize the content of the transactions for a given application.

Multiple Delivery Paths

At the highest-level, the system 1 is designed to enable services 140 to operate directly between the devices 110 and the back-office (supplier) 300 in some systems, or to be operating with the help of a device proxy 220 in others. This ensures the broadest possible deployment as rapidly as possible because the device proxy 220 can quickly bring many legacy devices into the service offering very quickly while user slowly get new devices which are directly enabled themselves. Having both modes of operation is also important because some users will prefer to have a proxy act as a consolidator/clearing house for messages leaving their site rather than from each device independently. In other sites, users may not want to install a device proxy and therefore need the services to be enabled directly. In addition to having each path enabled, it is beneficial to have them work together, because in the end it is possible for users to have both scenarios in place at the same time.

Just as multiple paths can enhance deployment flexibility, it is beneficial to make those paths invisible from the standpoint of the services provider. Preferably, embodiments decouple the devices 110 and proxies 220 from the back office systems 310 as much as possible. A strong abstraction and decoupling of these two halves makes it possible to deploy a capability in devices 110 or the back-office 300 in a staged and independent fashion. In addition, if changes need to be made to systems on either end, the changes will not ripple throughout the overall system 1 if proper abstractions are enabled, enhancing maintainability.

Referring again to FIG. 10, the abstractions throughout embodiments include, at the device level, an abstract device model 122 embedded in the DMA 120. Preferably, the abstract device model 122 is built using the DMTF's CIM as a base. The device model 122 and services platform 124 both reside in the DMA 120, in embodiments. Common services point into the supplier's domain 300 regardless of the services offered. And at the back office/supplier level 300, embodiments use a common API for service sponsors to build and administer services from the supplier back office 300. The common API deals with devices 110 all the same way, regardless of type or connection mechanism.

This architecture in embodiments provides flexible deployment options, sueii as deployment flexibility in terms of direct device communication to suppliers or communication via a proxy. In addition to that flexibility, the services themselves can be defined so that many of their parameters can be customized. This service customization can include, for example, the data that is sent as part of a remote monitoring service, the time of day or frequency at which meter reads are sent to the supplier. The exact configuration parameters can be specific to the service being offered.

The platform of embodiments is designed to enable the configuration of services to be easily managed. The system allows for the configuration of the services to be specified at the individual device serial number, for all devices at a user's site, or for all machines owned by a user no matter where they are. This management, in embodiments, is done in the back office controlled by the service provider.

Figure 3:
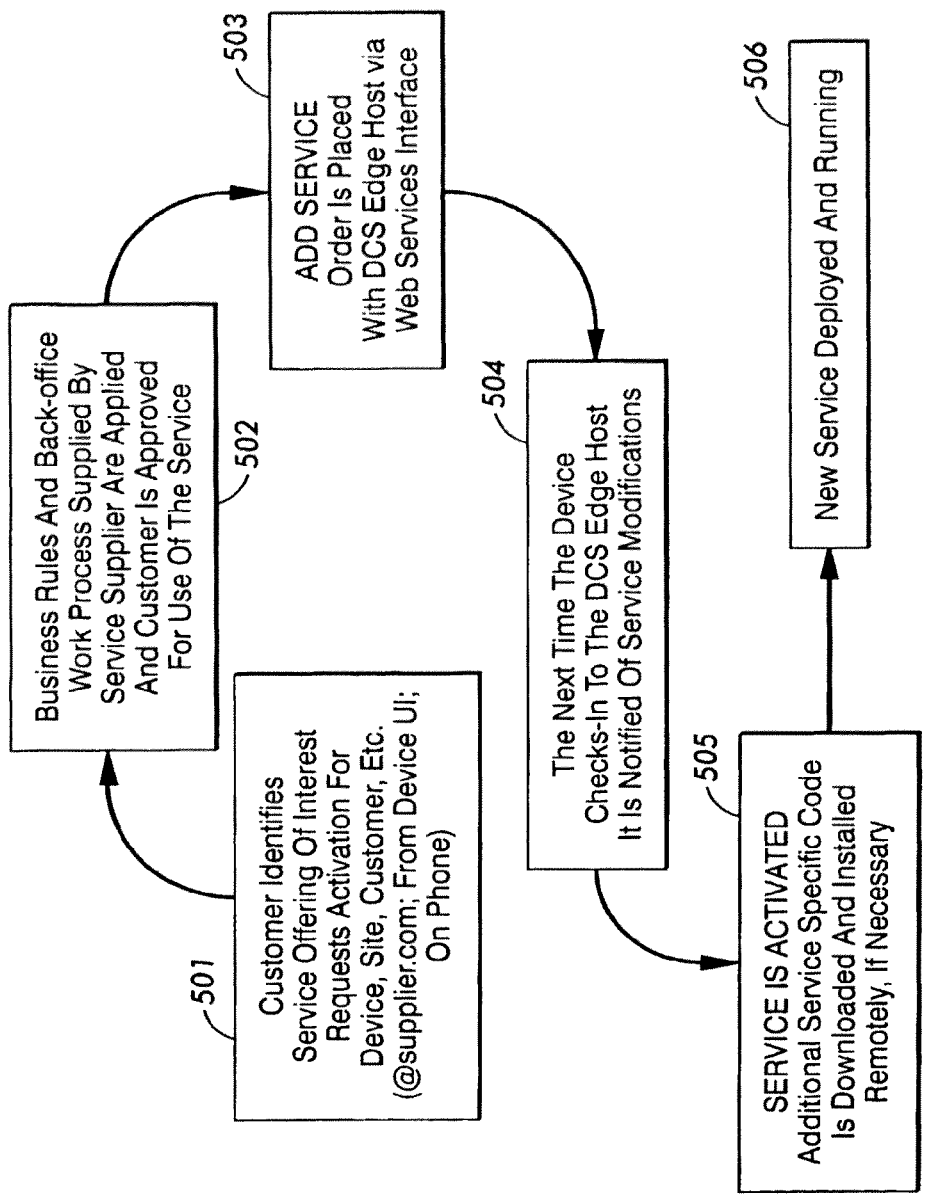
FIG. 3 is a schematic illustration of a method of service subscription and deployment according to embodiments.

An additional part of the flexible deployment options is the use, according to embodiments, of a subscription basis for the services available for devices, as illustrated schematically in FIG. 3. The subscription process can be controlled and managed, for example, by the individual service provider, and the services offered to any given device can be controlled by a combination of user desire and service provider authorization. Thus, not all devices, even of the same product family, need offer or have installed the same services at any point in time.

There are some activities relevant to DCS. For example, Axeda, Embrace Networks, Questra, and Imaging Portals have been active on the services front. An example of their technological implementations is Embrace Networks' patent application, PreGrant Publication No. 2002-0133581 A1, which is incorporated by reference. However, the prior art lacks provisioning aspects, and there does not appear to be any consequential support for provisioning.

While several companies, such as $4^1$ pass, sell general purpose provisioning software, none of the prior art appears to encompass the aspects of the instant invention. For reference, Sun has a general listing of such provisioning software at http://java.sun.com/j2ee/provisioning/industry.html. Further, all appear to be pursuing the cellular industry as their target market.

As mentioned above, global telecommunications companies are starting to deliver services over cell phones. To accomplish this, all use a Java standard called CLDC. This released standard describes how Java programs can be run on a small device such as a cellular phone and more importantly how modular programs called Midlets can be added at runtime to a CLDC Java environment.

Although the standard defines the unit of provisioning and how it is to be accepted and integrated on the device side, it says nothing about the server aspects. Because of this, telecoms have either created their own provisioning server solution or purchased one from the provisioning vendors listed above. There is no way to inspect them for alternate solutions because of the competitive environment in this area.

A second relevant standard is called OSGi. OSGi is a Java based, released standard which allows a collection of local, network connected devices to communicate with remote servers and download and run modular services. Compared to CLDC/Midlets, this standard has received much less support in industry.

OSGi also sidesteps the server aspects of provisioning.

A third standard is SyncML Device Management. SyncML is a released standard focused on the details of keeping mobile devices in synch with some server based sources. The focus in this standard is on things like calendars and appointments. In the last year, this synchronization protocol was extended with the Device Management effort to explicitly support the ability to change service settings on a mobile device and to be able to download services to it. SynchML sidesteps the server side of provisioning.

A last standard is unnamed but is commonly referred to as JSR-124. In short, Java programmers use the Java Community Process (JCP) to create and standardize Java Specification Requests (JSRs) as additions and extensions to the Java language. JSR-124 is the J2EE Client Provisioning Specification. J2EE is a standard for using Java in high end, transaction processing. A large and growing market has been growing up around it. Effectively, JSR-124 tries to define a framework within which to express provisioning systems in. Almost all the provisioning startups and many of the telecom companies are members of the JSP. It tries to be common enough so that all provisioning systems can interact with a J2EE system in a standard way but loose enough so that vendors can create alternate, competitive solutions. The standard is in the public draft review stage.

The definition and implementation of a common provisioning model based on a shared user service Hfecycle is included in embodiments. A Provisioning Server (PS) 310, the DCS devices 110 that talk to it, and the supplier personnel that interact with it all preferably act according to a shared model for how the provisioning process works. A lifecycle model can be created that defines the roles and responsibilities for each actor that interacts with the PS 310. Based on roles and responsibilities, grammars and commands have been created to allow the actors to accomplish their role based goals.

Figure 20:
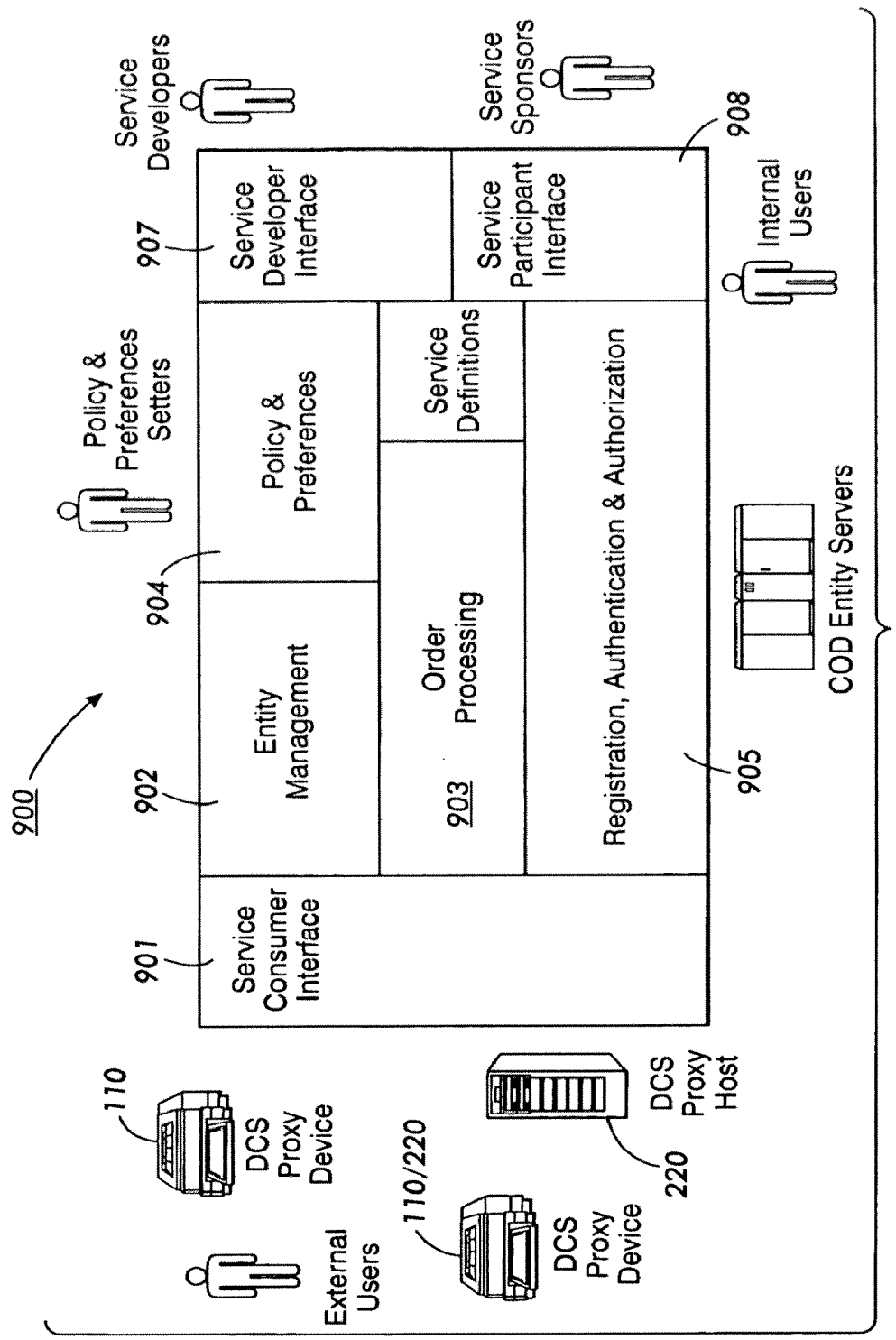
FIG. 20 is a schematic illustration of a provisioning server according to embodiments.
Figure 21:
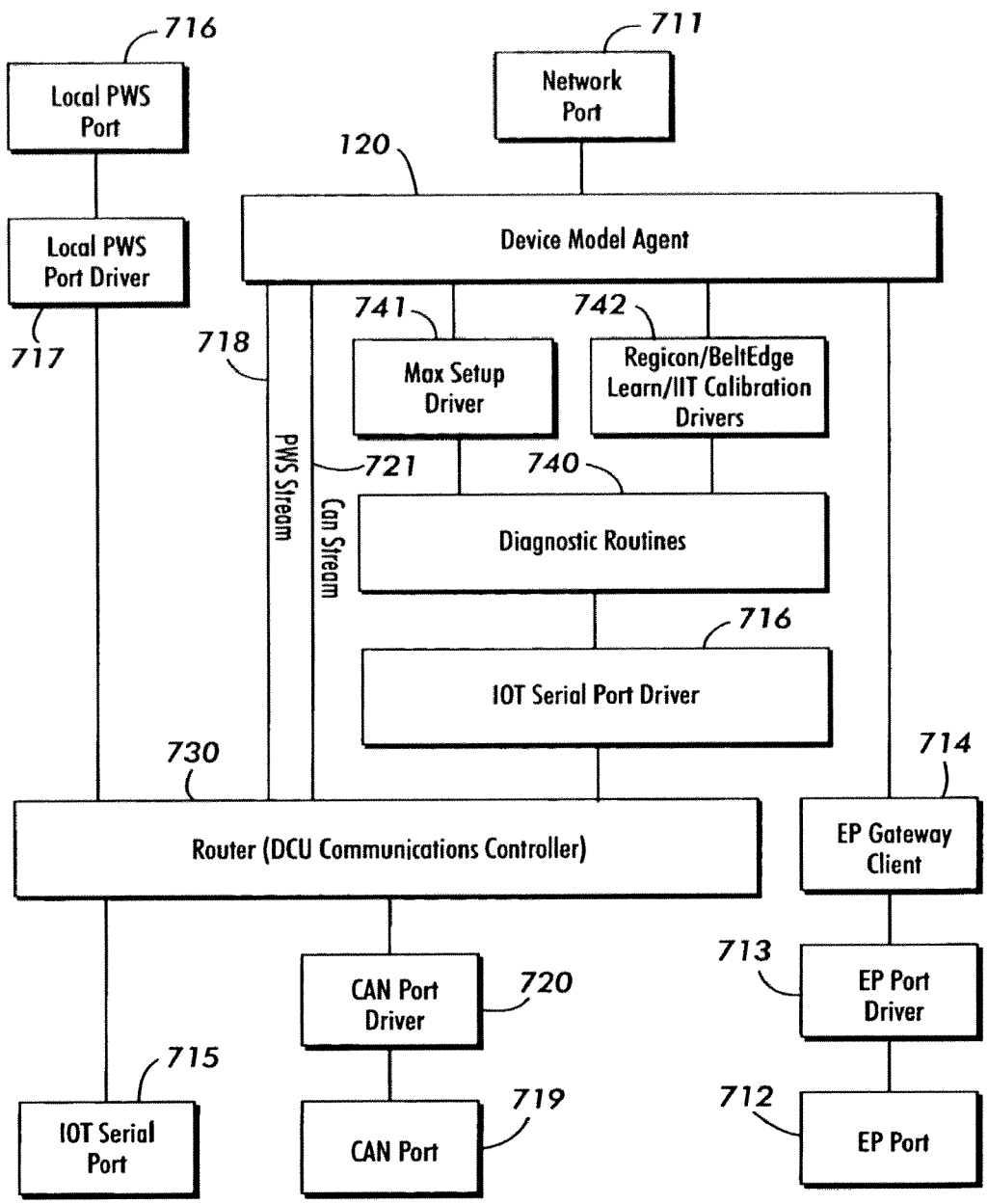
FIG. 21 is a more schematic illustration of a CS Platform add-on component according to embodiments.

The architecture and implementation of a provisioning server 900 running, for example, in the services host 310 that meets all the requirements in this section is schematically illustrated, for example, in Table 1 and FIG. 20. Working from left to right in FIG. 20, the first major module is the Service Consumer Interface 901. It is preferably responsible for all interactions with External Users and External Devices 110, 220. It also preferably isolates the other PS modules from the different protocols that Devices and Customers may use. The preferred protocol in embodiments is Web Services, but in the future may be extended to http, email, cellular or other transmission formats. For incoming transactions, it routes the transactions to the correct internal resource to process the request. For outgoing transactions, it takes the outputs of other PS modules that have been queued for a Device or User and translates them into the required protocol required to interact with the Device or Customer.

The registration, authentication, & authorization module (RAAM) 905 is responsible for maintaining the security of the system at all times. The RAAM 905 preferably authorizes all users of the PS and authorizes their ability to execute specific transactions. It is responsible for correctly registering all users, both internal and external. The RAAM 905 does this by working with the entity module 902 to obtain required information. The RAAM 905 is also preferably responsible to work with the service consumer and order processing modules 901, 903 to isolate security related artifacts of transactions.

The service definitions module 906 is responsible for maintaining all definitional information on all services 140 provisioned by the PS 900. Version information, file composition, service inter relationships, product line support, are examples of the contained information.

The service developer interface module 907 is responsible for supporting service developers in their work to develop, distribute, and update services. The service participant interface module 908 is responsible for interfacing with all users and directing service lifecycle and service transaction information to the right resources.

TABLE 1

| Actor | Definitions | Primary Roles & Responsibilities |
|---|---|---|
| Service Sponsors | Those organizations within a supplier or other parties that support creation and deployment of services on PS 900 | Use Service Developers to develop and deploy required code for the PS and DCS device portion of the service<br>Create tie-ins between local IM systems and the PS 900 such that commands issued by the service sponsors are synchronized to local state of IM systems<br>Direct PS 900 to enable and disable service for particular machine in |
| Service Developers | Those that develop code implementing a DCS based service | Develop code using DCS guidelines<br>Deploy code bundles making up service to the PS 900<br>Define service on PS by identifying relevant platforms and other parameter |
| Policy and Preference Setters | Those that define 'rules' that control all aspects of service deployment | Develop the 'rules' that define<br>how default parameters for a service should be configured<br>how and whether parameters should be uniform for a site, customer, geographic unit, or other grouping derived from service parameter information and/or IM systems |
| External Devices | DCS compatible machines located at user sites accessible directly or through local or remote | Use the PS to be notified of service life cycle changes (add, delete, modify, upgrade, etc.)<br>Use the PS to send requests for restores based on local catastrophic failure<br>Inform PS of relevant machine configuration changes |
| Internal Users | Supplier organizations that participate in execution of a service | Send service related transactions to the PS and potentially to other machines or other users<br>Receive transactions from machines in likewise |
| External Users | Non-supplier users that participate in execution of a service | Send service related transactions to the PS and potentially to other machines or other users<br>Receive transactions from machines in likewise |

The Entity Management module 902 is a generic PS resource that preferably localizes and isolates entity information from the rest of the server 900. The module holds information on entities such as machines, users, their preferences, and associated location information. For entity information that is not local, the Entity Management module 902 is the single point of contact with these other IM systems. The module 902 provides a seamless interface for local and network based information.

The order processing module (OPM) 903 is responsible for directing the processing of orders from Service Sponsors as well as those created by the policy & preferences module (PPM) 904. The OPM 903 interacts with required PS modules to achieve the order requirements. The OPM 903 also preferably tracks the status of an order to be able to respond to inquiries from Sponsors.

Embodiments apply soft computing techniques, such as, for example, rules and constraints, as a general solution to flexibly model, develop, and examine service policy. The provisioning decision itself is less important overall. That is, given a device 110 that needs a service 140, the PS 900 determines whether it is allowed, whether there is a bundle (the collection of code files that make up the service to be installed) that is compatible with the device 110 operating parameter information (model type, OS version, etc.), which of a plurality of bundles should be selected if there are a plurality, and what the parameter settings (if any) for the service 140 should be. Generally, in embodiments, code cannot be written that implements "business rules" that can be used to resolve the questions above. Coding would be required for every change of a rule, the rules would not be directly inspectable by policy makers, and it would assume that each question is separable from the others. Further, it assumes that there is a single policy maker that determines the answers for all the above questions. Thus, an alternate solution must be, and is, provided, in embodiments.

The introduction of an appropriate constraint or rule system provides advantageous benefits. Coding is dramatically reduced as the "rule" is entered at a higher level of abstraction. Additionally, the rules are inspectable by policy makers who may not be comfortable with computers or programming. Further, knowledge implemented as constraints and rules relating to each question can be more easily combined and separability doesn't need to be worried about. Constraints and rules use supports the reality of multiple policy makers that participate in the decisions of the above questions. Interfering rules and constraints based on differing groups participating in a value chain can more easily be identified and resolved.

The ability of the provisioning server 900 to use policy based knowledge to identify the correct bundle and parameters is advantageous in several situations. For example, this ability is preferably applied when the PS 900 has received an Add Service Request and needs to compute the answers to the questions above. Additionally, the PS 900 employs this ability when a Policy Maker for any service has made an update to the policy knowledge. The PS 900 can compute the impact of that change, addition, or deletion to the existing relevant devices actively connected to the PS 900. Then the PS 900 can generate the necessary change requests to the impacted devices 110 to achieve the goals of change and use the change in all future Add Service transactions. When the PS 900 is notified of a Configuration Change from a device 110, the PS 900 decides whether the device's services 140 and/or parameters should be changed because of that change. If necessary, the PS 900 can generate change requests for the device 110 as required by the policy knowledge.

Policy Setters can define uniform service versions or parameter settings based on Internal or External Customer requirements through use of rules. This uniformity may be defined at a user level, a site level, a machine category, or any other relevant grouping To summarize, the service subscription and deployment method includes identification by a user or user DMA 120 of a service offering 140 of interest and a request for activation of such service (block 501). During a scheduled check in with the edge host, or during a special connection for the purpose, the DMA 120 sends a message for the supplier system 300 regarding the interest and requested activation. The supplier system 300 retrieves the message from the edge host 410 and applies business rule and work processes to determine user eligibility (block 502). If the user is approved, the supplier system 300 notifies the edge host 410 that the requested service 140 can be added (block 503). The next time the DMA 120 checks in with the edge host 410, it receives the message that the service 140 can be added (block 504). The DMA 120 then activates the service 140, downloading and/or installing it if necessary (block 505). The new service is then deployed and running (block 506).

Sales of services can be done through a plurality of channels. This process is preferably owned by the sponsoring organization (the supplier of the service) and is done in whatever manner the sponsoring organization chooses. It can, for example, be done from the device it desired.

Once the sponsoring organization is notified that a particular user would like a service to be enabled on a given device, embodiments provide that the sponsoring organization applies whatever business rules and billing/invoicing processes it requires to comply with an applicable business model for that particular service. If the sponsoring organization determines that the device can be permitted to provide the specified service to the user, the sponsoring organization uses a common services order/entry API on the edge server to officially place the order. This can, in embodiments, generate a message that can set deployment and configuration of the desired service into motion.

Messages are preferably queued for delivery, and the process waits until delivery of the messages occurs. Once the requesting device or device proxy gets the order message, the systems are configured, additional software is downloaded if required, and the new services are started. The service sponsor preferably has the ability, via the system according to embodiments, to turn services on and off as needed based on whatever criteria the service sponsor determines is necessary. Services are preferably written to be device independent. The Common Information Model provided by the Device Model Agent provides a device independent representation of the common data and methods in embodiments. Services are configurable since all users do not have the same requirements. Having configurable services accommodates variation in requirements and operation that may be required. Services are dynamically loadable to enable rapid deployment of new services to users with devices already deployed in the field. And services have a lifecycle to enable management after they are initially deployed. Examples of lifecycle transactions include, but are not limited to, add service, delete service, modify service, sync services, device registration, and proxy registration.

The DMA 120 is defined, in embodiments, to enable the embedded computational power, data, and functions of the devices 110 to be accessed and used in services 140 that are deployed in a common fashion. An embedded agent 122 and service platform 124 enables embodiments to support local operation of services 140 that play into the overall system 1. This provides the common connectivity, service manager, common data access and methods, and secure communication to the service provider/supplier in support of services offerings.

Given the system, components, methods, and embodiments described above, there are a number of ways that the system can be deployed. This deployment flexibility is a significant advantage of this system and has implications on the detailed designs of the components and behavior models that the system follows. All of these deployment options can be instantiated simultaneously by embodiments given the abstractions and modularity defined. It is possible that in many user installations more than one option can be deployed to ensure complete coverage. FIGS. 4-9 and 11 show several exemplary embodiments representing possible deployment options for systems according to the invention.

Figure 4:
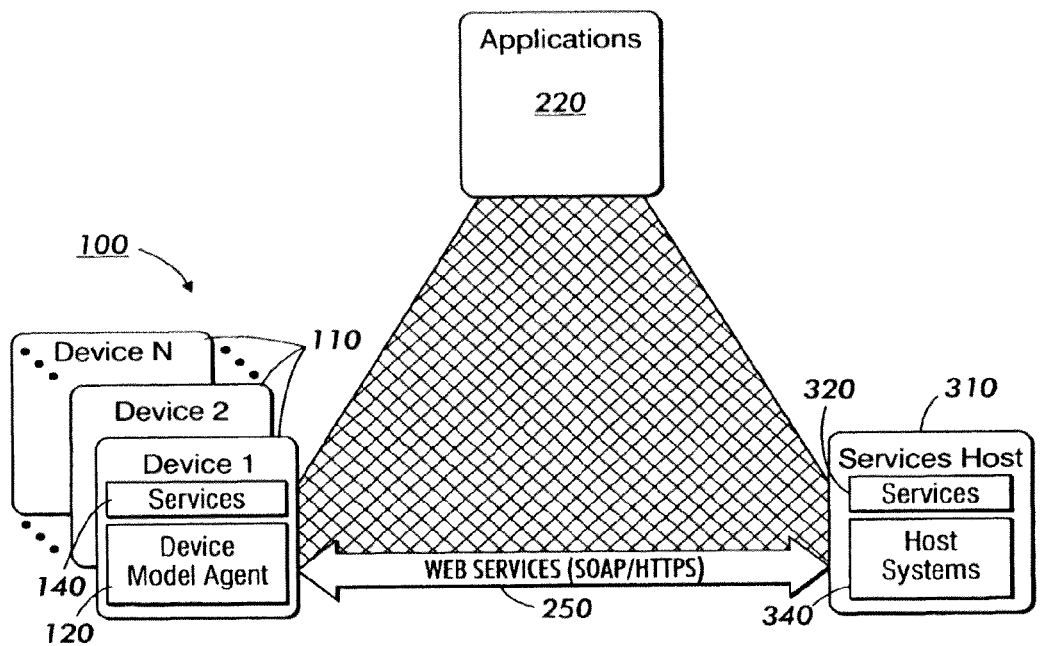
FIG. 4 is a schematic illustration of a deployment option according to embodiments.

Deployment A, an exemplary embodiment seen in FIG. 4, is a preferred embodiment for smart devices as are currently shipped by some companies, such as Xerox Corporation. It can limit the amount of infrastructure required of users to support deployment of services 140 and provides the simplest implementation. It need not require additional hardware or software to be installed in the user's environment, though devices 110 must be fitted with the functionality of the DMA 120, including the services platform 124, if they are not already part of the devices 110. This embodiment is not likely to address many machines already in the field unless the device software is upgraded or another method is employed to give the fielded devices the DMA and services platform. While communications between the device, via the DMA, and the back-office host are substantially independent of the physical medium, preferred embodiments employ the user's network and the user's Internet access to connect back to the supplier host system. Other communications schemes, such as, for example, local wireless, long distance wireless, telephone, wireless telephone, and satellite telephone can of course be used as well.

As seen in FIG. 4, each device 110 includes its respective DMA 120 and runs its own services 140 in its own services layer 141 facilitated by the DMA 120. Management and other applications 220 can be employed on another machine 200 that can also be in the user's environment 100 or can be elsewhere. The devices 110 preferably use web services 250, such as HTTP, HTTPS, and SOAP, to communicate with the supplier 300 and a services host 310 therein. The services host 310 includes services 320 and host systems 340 that can assess communications from the DMAs 120 and deploy services 140 when appropriate.

Figure 5:
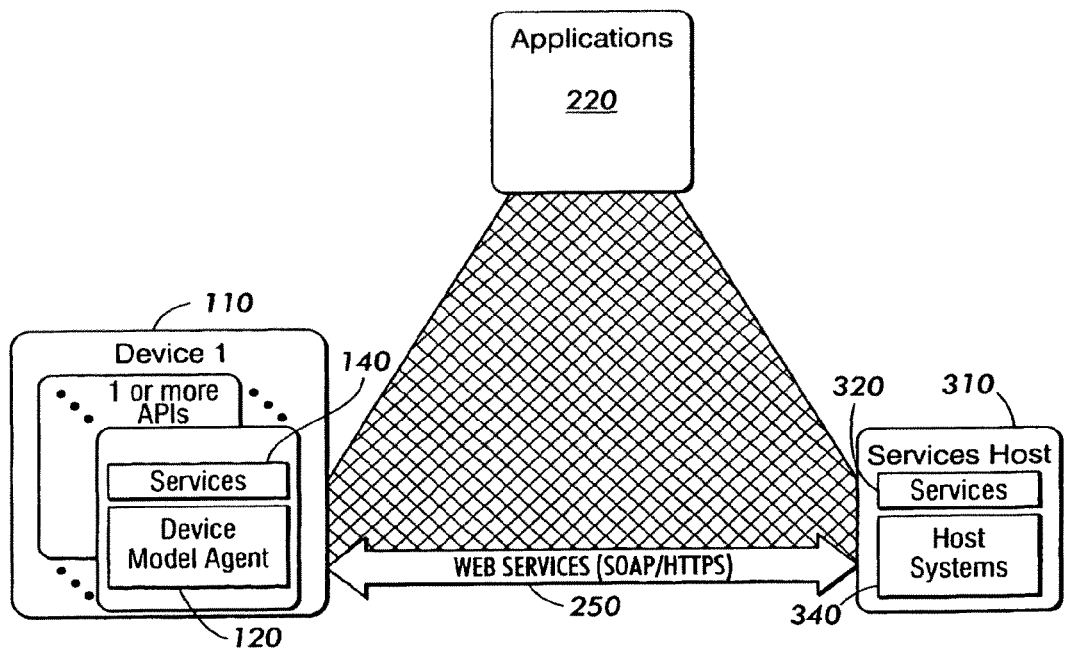
FIG. 5 is a schematic illustration of an additional deployment option according to embodiments.

Deployment B, another exemplary embodiment seen in FIG. 5, enables already fielded devices and devices produced by third parties who do not have the required technologies embedded in them to support device services. While multiple devices can be handled in such a manner, this description will focus on one such device for simplicity. In this case, a relatively small add-on component 115 is added to the device 110. The add-on component 115 contains necessary software and the DMA 120, as well as one or more connections to the device 110 to enable the add-on component 115 to gain access to the internal data and functions of the device 110. With the add-on device 115 attached, the device/add-on component combination looks like a completely enabled device, as in deployment A seen in FIG. 4, to the rest of the services infrastructure and back-office systems. This provides device services according to embodiments for legacy and third party production equipment. The add-on component 115, with the DMA 120 and its attendant services environment 124, then communicates with the supplier 300 via web services 250 as in deployment A of FIG. 4.

Deployment C, a third exemplary embodiment seen in FIG. 6, uses a proxy configuration in which an application 220 capable of acting as a proxy runs the services for at least some of the devices 110. Devices 110 that do not themselves have the required software enablers embedded, such as the DMA 120 and services platform 124. However, an application 220 acting as a services proxy for the devices can communicate with the devices 110, such as, for example, via LAN, phone, wireless, or other communications media. The basic proxy implements the services APIs 140 for a selected set of services 140, but preferably does not use the full DMA 120 and standard dynamic services deployment method to the devices 110 themselves since these features cannot be supported with the legacy devices. This deployment is also limited by the richness of the connection between the simple proxy and the device: if data or a function cannot be accessed remotely, then services that require them cannot be deployed.

Deployment D, a fourth exemplary embodiment shown in FIG. 7, is a more advantageous form of proxy configuration. This embodiment enables devices without the required embedded software enablers (i.e. the DMA 120), but that can communicate in other ways, such as, for example, via LAN, phone, or wireless, to participate in the services deployment system. The devices 110 communicate with one or more applications 220 that act as a services proxy for the devices 110. The services proxy is a DMA enabled proxy that can host a DMA 120 for each device 110 communicating with the services proxy. Additionally, the services proxy can manage the DMAs 120 for the devices 110 with which it communicates. This enables the services 140 to run in substantially exactly the same way on the services proxy as they would if the services 140 were running directly on the devices 110 themselves. This also enables additional local applications to be written on the services proxy that can take advantage of the DMA 120 and the common information model representations of the data and functionality of each of the systems. This can greatly simplify applications since they can be hidden from the implementation specific to each device and only have to build to the common representation of data and methods in the CIM. This is the same advantage that the services gain when written against the CIM and DMA. Additionally, portions of the DMA that can manage multiple instances of the CIM and services can be instantiated once and used to manage the DMA proxy of multiple devices. That is, the full DMA need not be replicated for every proxied device, which can make this embodiment more efficient that just dropping all the DMAs for the connected devices onto one server.

Another aspect of the services proxy embodiments is that portions of the DMA that can manage multiple instances of the CIM and services can be instantiated once and used to manage the DMA proxy of multiple devices. Thus, the full DMA need not be replicated for every proxied device; rather, one DMA can be used for plural devices. This makes deployment more efficient than simply dropping one DMA for each device onto one server.

In a particular version of deployments C & D, embodiments cover the deployment of a device proxy for a printer directly connected to a personal computer. The proxy can be hosted on a user's computer, and a printer, such as a printer connected via a parallel interface, is the device with which the proxy interacts. In embodiments, the proxy can also connect to the print driver for the directly connected printer as an additional source of data to populate the DMA or services interface. The computer can host the DMA and, to the extent supported by the direct connection to the device and the local instrumentation via print driver or other access mechanism, the directly connected printer looks networked from a services and systems management point of view.

Figure 8:
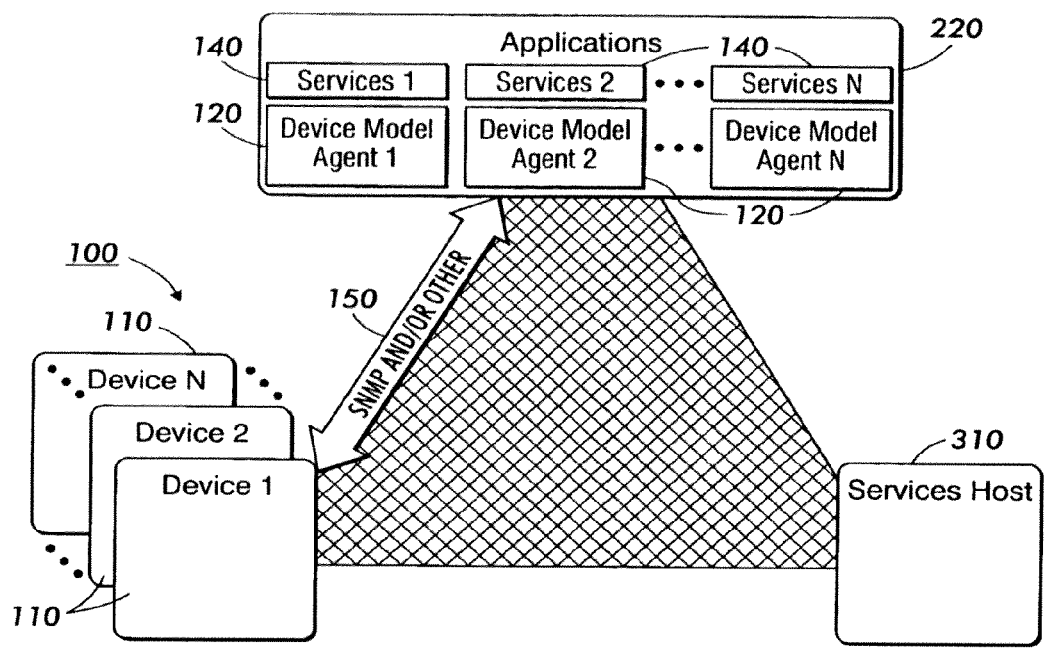
FIG. 8 is a schematic illustration of an additional deployment option according to embodiments.

Deployment E, a fifth exemplary embodiment seen in FIG. 8, comprises a local variant of the exemplary embodiments seen in FIGS. 6 and 7. Services can be offered locally, that is, within a substantially self-contained site, in a fashion similar to Internet-spanning embodiments. Such an embodiment uses the abstraction of the DMA 120 to enable more consistent management and service offering implementations to local devices 110. While this lacks the connection to back-office service providers 300, the services 140 can be unique for a user or simply self-contained for security reasons. Management of local services 140 and devices 110 can then be moved from a centralized locale for all devices 110 to a more localized domain. Users can, for example, assume the role of supplier, if so desired, in such an embodiment by running the equivalent of a back-office on their intranets, including application servers, and, depending on user security requirements, edge hosts. This will increase the complexity of the maintenance and support of such a system if offered by a third party, but is a possibly useful configuration given the abstractions defined.

Figure 9:
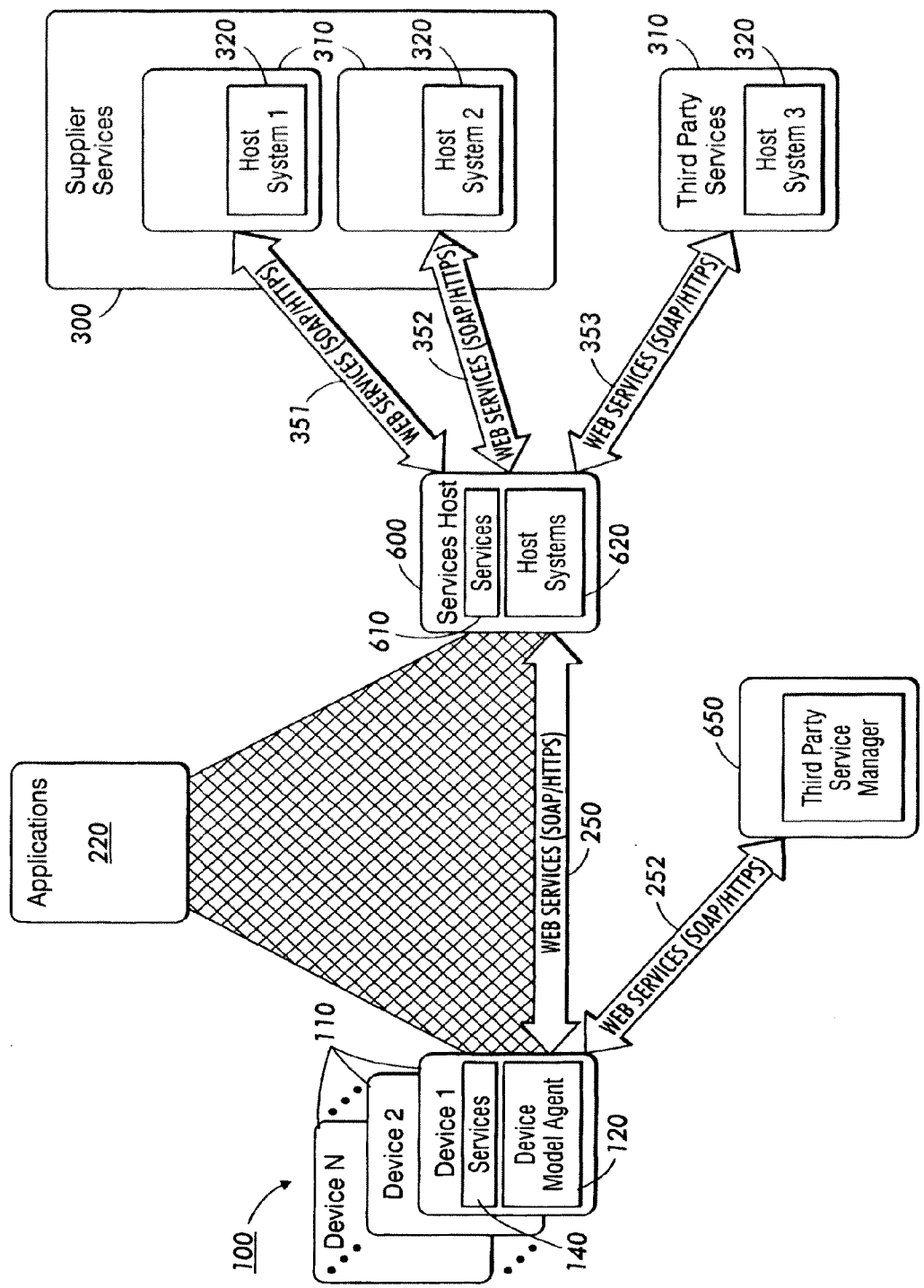
FIG. 9 is a schematic illustration of an additional deployment option according to embodiments.

A further exemplary embodiment, Deployment F in FIG. 9, enables multiple application servers 310 and/or multiple edge hosts 410 receiving communication from enabled devices 110. Deployment F is an embodiment that an combine, for example, elements of deployments A, B, D, and E. The services 140 can be written such that they describe everything required for the services 140 to check in in an appropriate fashion with appropriate application servers 310 via the appropriate edge hosts 410. In addition, the services host 310 to which the edge host 410 connects the devices 110 is not limited to any particular services host or supplier 300, but can connect to any suitable parties to offer services, as long as the services API presented by the edge host 410 allows such connection.

The Device Model Agent

Figure 10:
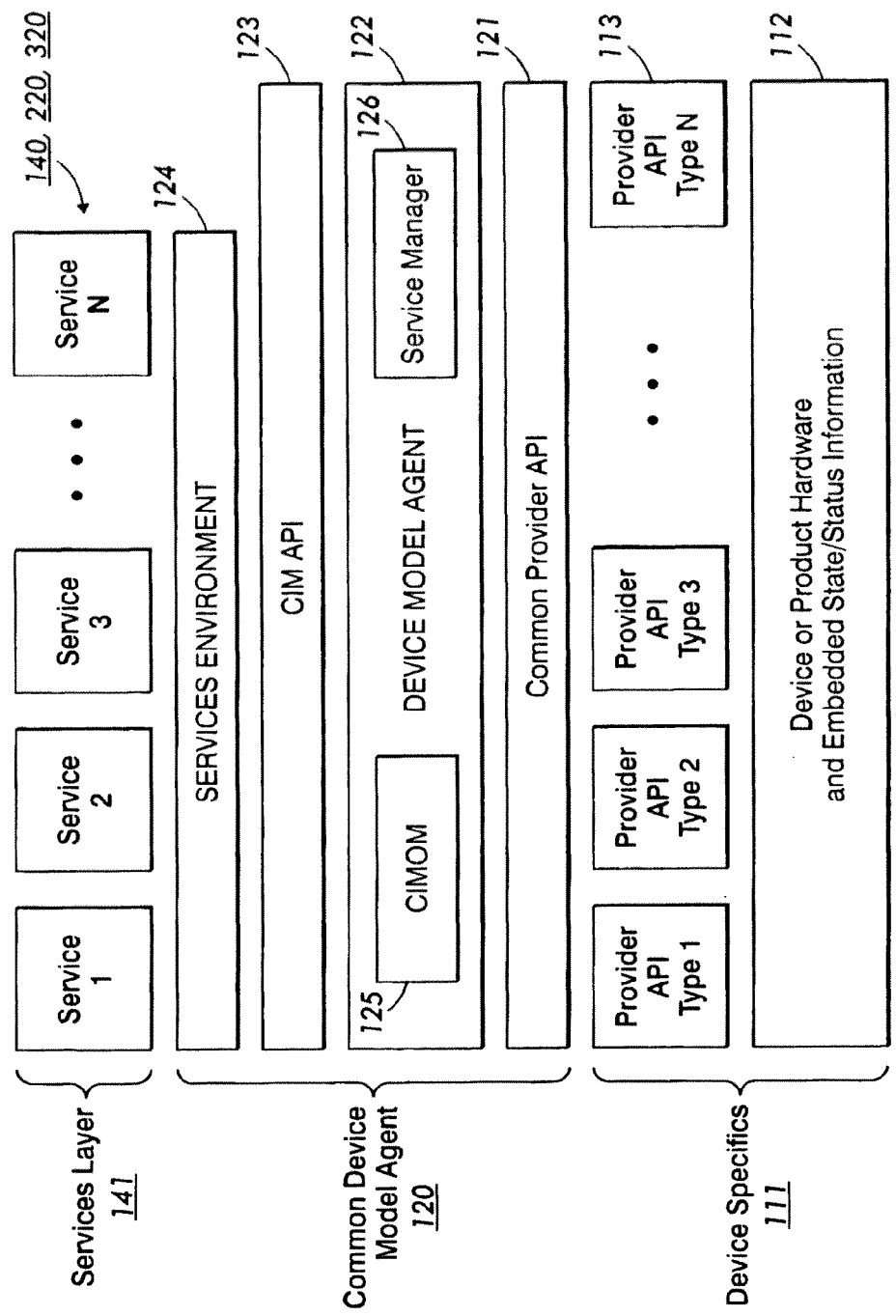
FIG. 10 is amore detailed schematic illustration of the device model agent according to embodiments more detailed schematic illustration of the interaction between devices, the device model agent, services proxies, and the services host according to embodiments.

The Device Model Agent (DMA) 120, as discussed above and as seen, for example, in the schematic illustration of FIG. 10, is an enabling component of the end-to-end system 1 according to embodiments. The DMA 120 can be embedded in devices 110, add-on modules 115, and/or device/services proxies to provide a common device model 122, a CIM API 123, and a device services environment 124 in which services 140 can run. The DMA's role is to provide devices 110 with the capability to actively participate in business process and services that surround the devices throughout their lives. It combines aspects of the Common Information Model Object Manager (CIMOM), from the Distributed Management Task Force (DMTF), and a novel environment for the operation and management of embedded and dynamic services. The agent is responsible for local operation of services and the management of information represented in the CIM. The agent interacts with the device, services (both local and distributed across a networked environment), and other distributed system components.

The DMA provides the device independent CIM API as specified by the DMTF, but also provides a device independent Service API. As a software agent, the DMA can engage in autonomous and adaptive behaviors, either initiated locally or through interaction with other distributed components. The DMA can also, for example, react to events in the device and the environment, again either locally or distributed, and, in embodiments, can engage in self-management of services and actions. In a preferred exemplary embodiment, the device independence of the DMA is extended through the use of, for example, JAVA and the J2ME small footprint JAVA standards. Of course, the DMA is not limited to this particular implementation and could be assembled in any suitable software structures with varying degrees of complexity and difficulty to provide all features. This exemplary embodiment of the DMA advantageously uses the J2ME Connected Device Configuration with the Foundation Profile to enable the broadest range of devices from large system components with many resources to small systems with limited resources. Again, the Device Model Agent is not limited to this implementation, and many others are possible in variants of JAVA or other programming languages as required by the device in which it resides. The J2ME environment can ensure that the DMA software is device independent and reusable across device and product platforms. J2ME also offers support for networked and distributed systems, embedded security capabilities, and support for dynamic download and operation of code.

Preferably, embodiments include extension of the device independence of the agent through the use of a platform-independent standard, such as, for example, the JAVA and the J2ME small footprint JAVA standards. Of course, the agent is not limited to such implementations and could be assembled in any software structures with varying degree of complexity and difficulty to get all the features. Embodiments of the agent using a J2ME Connected Device Configuration with the Foundation Profile can enable a broad range of devices, from large system components with many resources down to small, embedded systems with limited resources. Many other embodiments are possible using variants of JAVA and other programming languages as required by the device in which the agent is to be embedded or which the agent is to represent.

The J2ME environment is a preferred environment due to its ability to ensure the agent software remains substantially device independent and substantially reusable across device and product platforms. In addition, J2ME includes support for networked and distributed systems, embedded security capabilities, and support for dynamic download and operation of code.

In addition to the benefits described above, the DMA provides the ability to hide multiple, disparate sources of data behind a common provider API. This further abstracts the details of the device from the software agent. In embodiments, four separate sources of data can be unified behind the common provider and CIM so that the services need not know the details the data sources. For example, EPSV, PWS, CAN Bus, and Web UI, data can be managed in this fashion. A set of tools can also be provided in embodiments that enable the provider layer and the CIM contained in the Device Model Agent to be easily customized for a given product or device. This encourages reuse and speeds release because programs adopting or maintaining the Device Model Agent need only be concerned with the mapping of CIM element to the source of data and not the management of the entire Device Model Agent.

An enabling feature of the end-to-end architecture of the system components is the inclusion of in embodiments, an appropriate abstraction of the communication methods employed between various distributed components. This abstraction is preferably applied to the physical connection mechanism, as well as to the protocol level up through session level. Such abstraction at both levels helps to hide the details of the communication method from the distributed components, allowing them to focus on the operation of the services and decoupling them from changes in the communication media or protocols. For example, this allows the system to use email over a wireless link or Web Services over a dedicated Ethernet link without the services themselves caring which is used.

This type of abstraction is new to devices and provides several important benefits. It provides for flexibility in deployment of the system components for any given user. Information on the Quality of Service that can be expected from any given combination of physical and protocol, up through session layer, connections can be carried. The system can have a component on the host/back-office side that monitors the Quality of Service for various configurations to assess the effectiveness of a communication link for providing the quality of service required by a given service offered to a particular user. This is an element of the provisioning and self-monitoring portions of the overall end-to-end system.

The communication abstraction also provides some fault tolerance. If one connection mechanism goes down for some reason, the communication module can detect that and replace the failed connection with another working one without the rest of the system knowing other than the fact that potentially a change in the quality of service has occurred.

In embodiments, services can alternatively be "hardcoded" into a device or proxy. This means that many of the management functions associated with dynamic adding and deleting of services is not required. The embedded portion of the service that is to run at the device must be compliant with the web services transactions between distributed components. This enables the back-office to effectively treat "hardcoded" services the same way as full, dynamic services in the system.

Hardcoded services can be enabled by back-office subscription. This enables the service provider to control the particular services enabled on any given device, which gives the service provider the flexibility to determine how the services offered will go to market based on business need. For example, the services can be part of a package, offered for free, be offered for a price, require renewal, be offered on a trial basis requiring another transaction for full service provision, etc.

Hardcoded services preferably share a common underlying set of behaviors and specific extensions for their particular requirements. Preferably, the services have components that work together, but ran on the devices themselves in the embedded services platform, on the intelligent proxy, and/or in the back-office server. Though hardcoded, these services can be configured and managed by the service lifecycle management system in the supplier/service provider back-office.

The types of standards embodiments preferably use include the Distributed Management Task Force (DMTF) Web Based Enterprise Management (WBEM) and Common Information Model (CIM). As described above, the CIM provides embodiments with device model and abstraction to enable services reuse. Additionally, embodiments employ web services. XML, various versions of I-ITTP, and SSL. Embodiments can also use server side certificates from, for example, VeriSign, which enables communication across firewalls and the Internet. To enable application environments in the device and in the back-office, embodiments can employ, for example, Java 2 Micro Edition (J2ME), Embedded Virtual Machine from Insignia Corporation, Java 2 Enterprise Edition (J2EE), the BEA WebLogic 7.0 Application Server Technology Suite, and Orade8i. Of course, these are only examples, and additional components can be used where appropriate. Further, it is likely that new components will be developed that are not currently foreseen and that can be added to the system of embodiments, which components fall within the scope of embodiments. The services provided, their lifecycles, and the extension of the DMTF CIM for specific products are examples of new technologies within embodiments.

Embodiments further enable the rapid addition and roll out of new services to already deployed systems. For example, say that soon after the launch of a new product a new diagnostic service is developed based on lessons learned from the first three months of its operation in the field. The exact nature and behavior of this service could not have been anticipated when the product was launched, so the diagnostic service would not have been included in the launched product. Embodiments allow such a diagnostic service to be added to installed devices at substantially any time.

Embodiments contemplate the service model and internal specification of what a new "service bundle" should include. Thus, in addition to the permissions and configuration information for a service, new code can be downloaded if needed to add a new capability to an existing device in the field. This feature can be used in conjunction with, according to embodiments, an embedded services platform on the devices that are designed to accept the new functionality easily. In addition, when used in conjunction with the embedded services platform of embodiments, the new code for the new services can be reused across platforms because of the device independent abstraction provided by the embedded CIM in the DMA. For devices without such a platform, new code can still be added as, for example, a more specialized software download service for patches and upgrades in the field, but the code to enable those services will most likely be platform specific and therefore less reusable.

This system of embodiments can offer diagnostics routines and other services in a way that is very flexible for the device platform. To the service provider in the back-office, such enabled devices look like every other DMA enabled device according to embodiments. In addition, all the services for the device family that run locally on the device internal platform can still communicate directly back to the supplier systems rather than through an intelligent proxy.

Another variant in deployment is to fully embed the DMA into the product itself. This implementation is in a way very similar to the Example 1 implementation in that they are both DMA enabled platforms. For this example however, the small footprint DMA services platform is embedded into the product and communicates with both a Print Station Interface Platform (PSIP) and with an embedded device controller. The limited resources required by the small footprint system is acceptable to that product and development and integration of the required interface components are relatively easy.

The reusable DMA is a "drop-in" to systems that already have a JVM. The small footprint DMA is not a drain on the system resources and can greatly speed the enablement of such platforms.

Automated Meter Reads

Another example of using the deployment flexibility built into the embodiments is seen by looking at the system from the perspective of an end-to-end service. In this case, the service is automated meter reads. This service focuses on acquiring the monthly or quarterly meter reads typically received via phone calls, faxes, emails, or web entry without a human in the loop. This can increase both the accuracy and timeliness of the reads, save time for users, and enable suppliers to improve invoicing and billing.

Since the data required from the devices is small and is already largely available, an intelligent proxy can be employed, which can facilitate the participation of all SNMP enabled products. This, used in conjunction with devices that are DMA enabled but not fully SNMP compliant, means broad coverage can be achieved rapidly. Again, the abstractions and the system modularity in this case are significant. The back-office system doesn't need to know which way the devices have contacted the supplier (directly or through a proxy); all it needs is the device's serial number and it can then request meter reads when they are due. This decoupling of the way devices are enabled to participate in the services and the requests made by the back-office service provider is an advantage in providing deployment flexibility.

Early Warning System

In embodiments, a reporting system, a remote monitoring service, and other remote services are combined to assemble a set of tools to support more testing in the field. The underlying systems and data collection services can be complementary to data collection systems that rely on human observation and reporting. Together, the combination of systems provides a much greater, integrated set of knowledge upon which engineering teams can base product problem resolution activities. In addition, the common model for data collected from devices in the field creates a mechanism for deploying reporting tools and basic performance reporting that can be used across platforms.

Premium Remote Assistance Via Remote Control and Device Services

One of the basic principles in embodiments is that the devices themselves should take an active role in their own lifecycles and support. This works in a number of trouble or status reporting situations. It may even work with an embedded diagnostic agent in the device that can monitor system performance and make software or configuration changes automatically in order to keep the system running well in the field. However, many problems that users experience are related to user problems and operational errors as much as they are related to device failures. In addition, as we all know, since marking machines are complex electro-mechanical systems, they cannot always be repaired remotely.

To address the operational support needs of devices in the field and to support new ways of working with the operators is pursued. For the time being each service will need to consider how to manually include non-connected devices in the offerings. A summary of the pluses and minuses of each option are in Table 2.

TABLE 2

| | Wired Connectivity | Wireless Connectivity | |
|---|---|---|---|
| | Option A: | Option B: Local | Option C: Long Distance |
| + | Available to all network devices in sites with Internet access. No additional user or supplier cost for use of LAN and Internet Phone line can be added regardless of printer/stand-alone option | Use wireless connectivity will eventually be available in printers | Technology exists for both cellular and two-way pager options. Can be purchased off the shelf from several companies or optimized specifically for supplier from standard technologies available. Potentially good answer for unconnected devices if leverage supplier's existing pager/cellular service plans. User feedback has been positive for this option for unconnected devices without |
| | Some additional traffic on users network Unconnected systems not covered by LAN option Phone line option is added expense to enable and operate Phone line connectivity has proven to be difficult to maintain. | Wireless capability not yet available in non-connected printers yet. Wireless access points for connectivity to rest of network may not be present Local wireless still requires either A or C to be present to complete the link to supplier. Need for wireless may be temporary as more devices become connected. | Two-way pager and cellular add-on components costly. Users have security concerns about networked devices that are also connected wirelessly to another network. Bandwidth limited vs. wired connectivity Need for wireless may be temporary as more devices become connected. Add-on boxes are likely to require unique communication interfaces to connect the box to each type of | on site, a remote UI and a human to human support system are combined in embodiments. Support automation solutions can be complementary parts of a premium service and support offering. It automates data collection and remote monitoring as well as offers many remote services described above. The combination also provides an excellent way to work directly with the device operators via a shared UI to help them when additional training, problem resolution, and software tweaks are required.

Connectivity Trade-Offs:

Some exemplary options for the communication link between the devices in user sites and the back-office are shown in FIG. 41. There are three primary options labeled A, B and C. Notice that only options A and C complete the connectivity between the devices and the supplier back-office on their own. Option B needs to connect to A or C to complete the link back to the supplier.

All connectivity options preferably reuse the same back-office infrastructure even though they may enter the supplier via different mechanisms.

All options are attractive because as a group they can provide additional flexibility for deployments that will meet a variety of user requirements. The preferred method of connecting, when feasible, is Option A—Wired connectivity via LAN and Internet. This is the option of least development investment and least operation expense. In the short-term this is especially important while the value of the services is being proven and resources need to be focused on initial services development and delivery not additional ways to connect to devices. It does not, however, address unconnected devices that will initially be left out of the services if only this option The next preferred method of connecting is Option C—Long-distance wireless via cellular or 2-way pager technology. The system can work in this configuration seamlessly with wired devices, and having capability available would enable some user problems to be solved when they come up. However, there are some challenges with deploying the wireless capability on a large scale over a large number of products. For example: developing a number of different add-on modules to be compatible with the very wide array of products in the field could be costly since few systems have the same interfaces to access detailed device data and operations. Additionally, the added expense of adding wireless connectivity and communications costs may be prohibitive until several services are available to use the connection. Simple, more easily deployable wireless configurations have inherent limitations on the number and types of services that can be offered, making it harder to justify the cost. Finally, users voiced concerns with networked systems that also had wireless connections since this is a way that suppliers/service providers or another party could bypass their firewalls and potentially access other resources on their network.

Finally, Option B—Local-wireless connectivity. This method can be used depending on how the local wireless connectivity technologies integrate into our user's environments and printers specifically.

Supporting End-to-End Infrastructure for Device Services

A supporting end-to-end infrastructure for connecting devices in user sites back into legacy systems and business processes is required. The end-to-end system shown in FIGS. 1 and 2 is an initial exemplary embodiment of an end-to-end infrastructure. It supports the basic dual-mode of device participation (direct and via a services proxy), uses the initial service communication and subscription models, and employs a common entry point for services data and actions via an edge server hosted, for example, in the supplier environment. The edge host can be partitioned in a manner suitable for additional embodiments, but can also be physically hosted on one system, minimizing start up costs while penetration and adoption ramps up.

preferred embodiment the user would use the browser on their DFE as the local UI for the CS Platform 115. The CS Platform 115 is preferably networked and configured, just as any browser is configured, to know the local network proxies, firewall passwords, DNS server IP addresses, and so forth, so that it can connect to the edge server which is available on the Internet 400. When running, the CS Platform 115 will use this connection to check for messages and instructions and will send required data in support of subscribed services 140 as

TABLE 3

| Enabling Technology Evolution | Infrastructure Evolution |
| --- | --- |
| High-end devices can act as services proxies for other devices they find within their environment if the users chooses | Edge Host focuses on service provisioning and transaction management |
| Device can participate in a combination of services directly or through proxies. | Supplier maintains common DataMart where CIM data from all devices is stored and is accessible by a variety of internal supplier functions. |
| Secure communication initiated by either devices or supplier can be deployed services that require high level of service guarantees. | * In addition to sending data to the DataMart, data/events are routed based on subscription and services needs directly to the service sponsors |
| CWW can communicate with new devices via the CIM protocol vs. only SNMP | The physical split between the Edge Host, database, and service specific |
| Device can participate is services via wireless connectivity directly from them to supplier. | Authentication/Authorization of devices and communication is handled centrally via supplier systems. |
| | Provisioning and software/tools for services to define the business rules which describe how devices need to be configured to participate are established and used to deploy new services |

Each of the areas listed in Table 3 represent areas of technology development or areas where third party COTS systems need to be acquired and explored. They also represent areas where the full requirements for the technologies are not yet known. As described above, printing products not originally designed to support user assisted self-help programs, device-centric services, and/or remote monitoring for ECAT sometimes find that such offerings are important to speeding initial delivery and to continued success of the products. A need of such products is to receive daily (or at some other period) reports from devices in the field as to their state and how they have been used by the user. We have called this service Remote Monitoring. This is important as it allows the program team to identify problems earlier in the field and provides important information to enable, sales, marketing, and support to improve their outputs as well.

One solution to this is to offer the Device-Centric Services (DCS) Device Model Agent (DMA) 120 on the controller and connected locally to the IOT from there. The add-on component or Customer Services Platform (CS Platform) 115 is the solution to this need. The CS Platform 115 can take the form of an embedded system that connects locally to the IOT through one or more of several existing interfaces, unifies the view of that data and functionality, and provides a local UI for operation, management of functionality locally, and the services platform 124 and APIs for remote connectivity and device-centric services. The CS Platform 115 is a product embodiment of both the DMA 120 and the embedded services layer 141 enabled by the services platform 124 in the Device-Centric Services framework.

With reference to FIGS. 12, 16-19 and 21, the CS Platform 115 can preferably take the form of a networked, embedded personal computer. Additionally, the add-on component can take the form of a headless box. In whatever particular form, the add-on component 115 is connected to the IOT via at least one physical interface. The UI for the CS Platform 115 is available at any browser on the local network and is served by an embedded web server 130 in the CS Platform 115. In a well. The edge server manages the queues, messages, services, and transactions associated with the end-to-end operation of the device services.

Preferably, the CS Platform 115 is a low cost, embedded personal computer based platform with a motherboard 701, and an embedded software operating system 704, such as Linux, though other operating systems could be used. The add-on component 115 can be customized with hardware, such as an auxiliary input/output and static memory board 702, but such customizations are preferably minimal to keep costs down. The component 115 is designed to enable the internal hardware platform to change over time to follow the minimum generic personal computer value curve which can reduce the cost of the platform by ⅔. Memory, such as compact flash memory, for example, can be used as an internal storage medium 703, which has improved reliability over hard disk drives. The use of compact flash memory also lowers the cost of upgrading the CS Platform 115 if new services 140 to be deployed require additional storage resources, yet the compact flash memory appears to the system as a normal hard disk drive. Further, the use of standard personal computer technology in the add-on component 115 enables rapid revision to follow cost curves and trends and also ensures that standard add-on technology (for example a web camera) is compatible with the platform.

Examples of connection paths between the CS Platform add-on component 115 and the IOT of a device include Electronic Partner (EPSV) 712-714, a Fuji Xerox protocol and interface; RS422 and/or RS232 serial port 715, 716; PWS 717-718, the connection used by the customer service engineers to connect their service laptops to devices; CAN bus connection 719-721; and USB (not shown). Additional interfaces, such as a proprietary interface to the digital front end, could also be monitored to provide additional data for services and system management activities. Other connections fall within the scope of embodiments, as well, especially since the CS Platform 115 is preferably designed in such a way as to not be limited to these connections.

A router 730 is preferably included and responsible for managing the multiple information sources and handling preemption of some activities given another connection becoming active. Communication is thus mediated in such a way as to allow communication to occur without data corruption problems.

An embedded software system preferably provides the flexible components in support of both locally hosted functions, such as the diagnostics routines described here, and services that can be dynamically added and configured. Embodiments thus contemplate a system component based on the Device-Centric Services platform and embedding the DMA 120, and an embedded JVM and web server to enable the CS Platform 115 to act as a local enabler for the system to actively participate in device-centric services.

The embedded DMA 120 enables services 140 to be offered directly from the device 110 regardless of its digital front end and/or ability to run the DMA 120 on its own. This enables the device 110 to participate actively in services offerings via the DCS services model. The add-on component 115 also provides a programmatic interface for new services 140 to be built around the system, enabling rapid and robust solutions integration with the product. Further, the inclusion of a web server 130 in the add-on component 115 allows web services transactions and services directly between the CS Platform 115 as an interface for the IOT and remote service offerings.

A customized IOT diagnostics offering 740 geared towards a trained user rather than the customer service engineer provides easy to use, globalized UIs for predefined diagnostics already offered by the IOT. The diagnostic routines can, for example, optimize toner density levels and obtain consistent image quality (MaxSetup 741). Other services 742 that can be offered include Belt Edge Learn, a routine that learns the edge of a new intermediate belt to improve lateral registration and belt steering performance. The purpose of Belt Edge Learn is to track the belt movement using the two Belt Edge Sensors. Using data received from these Sensors, the IOT automatically adjusts using the Belt Tracking Roll/Motor/Sensor to ensure that the Belt rotates without any inboard/outboard movement. More services can include RegiCon, a set-up routine that sets up the complete image on image registration system found in the IOT, and Halftone, a set-up routine to adjust the halftone densities printed by the system. Printing a halftone pattern places a user-definable level of constant tone over the whole page. The halftone pattern itself is used to diagnose problems, as almost every image quality defect will show up in a halftone pattern.

The CS Platform add-on 115 preferably employs a web based UI through an embedded web server. This saves hardware cost on the CS Platform 115 itself and instead uses the monitor, keyboard and mouse hardware associated with the digital front end of the device 110, which is almost always present and networked. It is also accessible from any other networked PC with a suitable browser on the local network. Such a UI offers increased ease of use and extendibility for new services and capability over time. The cost of providing a GUI just for this application would be prohibitive. The web based UI can include, in embodiments, context sensitive help and links to a call center and other support sites, making the system much easier to use. The UI can be available at any connected browser on the user's LAN, including hardwired networked personal computers. Further, wirelessly connected personal computers or handhelds with compatible browsers could also be used as a UI if a wireless access point is connected to the CS Platform 115 directly or installed on the user's network.

The Device-Centric services add-on component 115 of embodiments preferably comes equipped with several services pre-loaded and authorized, though this need not be the case. The CS Platform follows the Device-Centric Services model for subscribed service offerings. The PDT has made the decision to enable a basic set of services. Additionally, the component is preferably enabled for software download and remote upgrade of the CS Platform firmware via notification from remote site.

The system, through the synchronization service, will preferably periodically check in with the remote DCS host 310 or 410 to see if new transactions are waiting for it. One of those could be that new software is available for the system. If so, the user can be notified via an upgrade status screen available from the administration tab. The user also has the option of manually checking for updates via a refresh status button on a software upgrade screen. If an upgrade is available, the user has the option to accept it. If accepted, the software download process automatically downloads the required updates, installs them, saves the older version, and reboots the system.

The component 115 provides secure, encrypted communication back to the supplier in support of eService offerings. Diagnostic routines of embodiments, even though completely local in operation, are treated as services. They can then be controlled via the services subscription model used for all services. This allows the functionality of the CS Platform to be effectively turned-off when it becomes necessary to do so.

An initial set of services can preferably be offered to the user by the system. Such an initial offering can include, for example, Automated Billing, Automated Supplies Replenishment, and Remote Monitoring. Automated Billing is preferably a subscribed service that on demand or automatically reports the required billing meter to the supplier via the Device-centric services infrastructure. Automated Supplies Replenishment, as the name suggests, is preferably a subscribed service that tracks toner usage, area coverage, and toner bottle change events in order to supply the supplier with the information necessary to ensure the timely and accurate delivery of meter supplies to the user's site without human intervention. Remote monitoring is preferably a service that periodically gathers up a configurable set of data found in the system, models it in a standard fashion, and publishes it back to the supplier. Examples of the type of data found in this service include billing meters, IOT faults, media path jams, image area coverage, media usage (weight, size, and type), feature usage, toner status, simplex/duplex quantities, media tray usage, reduction and enlargement, copy modes, and High-Frequency Service Items status.

An additional set of services can be embedded in the system to ensure proper system operation. For example, DMA Housekeeping Service, Health Monitor, DMA to IOT communication status Monitor, and Services Synchronization Service, a service that periodically checks back with the remote portions of the DCS system to see if there are new instructions or activities the DMA should be doing.

To ensure security, the add-on component 115 employs in embodiments standard, secure web data transmission technologies and certificates. For example, VeriSign certificates, RSA encryption, SSL, and related technologies can be employed. Additionally, the add-on component 115 can provide a detailed transaction log allowing the user to inspect all the messages sent from the device. All transactions sent from the CS platform 115 can be logged in XML form before they are packaged for transmission and encrypted. This provides another layer of inspection capability by the user to increase confidence in the supplier's statements that we sending only what we say we are.

Three levels of authorization can be invoked before data is sent to the edge host 410, in embodiments. It is expected that contractual agreements will state that data will be sent automatically and the user will have the ability to inspect the transmission logs. Options are designed into the system to accommodate multiple levels of authorization for users who require different agreements to be made. The levels can include Audit and Log, in which records of all transactions are kept in the transaction Log; Simple Notification, in which a user representative is notified via on screen message, email or some other mechanism when a transmission to the back-office is accomplished; and Approval Before Sending, in which a queue of messages to the back-office 300 is maintained and the user representative is notified when the queue is not empty. In Approval Before Sending, the user representative can inspect the messages if desired and can then OK the sending of the data. The default authorization level is configurable, though the preferred shipped default level is Audit and Log. Previous assisted self-help tools and even the diagnostics access on the LOT itself had one password for all functionality. There was no way for the previous system to accommodate multiple people roles and manage passwords accordingly.

In embodiments, the multiple roles enabled can include Technical Key Operator (TKO), Customer Service Engineer (CSE), and System Administrator (SA). A system for configuring the access for any given role is provided via the web based GUI. Passwords are preferably initially set to common passwords individualized for each role. The system of embodiments contemplates allowing the SA to configure his or her own password and manage the passwords of the TK); enabling networked role based password management using standard IT industry processes, protocols, and procedures, and enabling remotely authenticated login and password management for any or all roles. Remote login may be especially attractive for CSEs who want to use their same password on any CS Platform 115 that they visit. Authentication for remote login can be password only, a combination of password and token, or any other suitable method. This would be limited by the network connectivity of the CS Platform to the remote host site and a back-up (or local) common CSE or user role password would need to be supplied.

The platform even can include a process for remotely resetting local passwords that are forgotten. The SA calls the help desk and is successfully authenticated as who they say they are. The Help desk places an order to the CS Platform (identified by IOT serial number) to have it reset its SA password. The SA is told to manually press the SYNC button, causing the CS Platform to check in with the Edge Host 410, receive the order to reset the S A password, and complete the operation. If all else fails a CS Platform Factory Reset procedure can be followed which will reset all the passwords to default configuration.

New software services 140 can be added to the CS Platform add-on component through the normal DCS service subscription and activation processes. Subscribed services can be automatically managed and installed by the DMA 120 and the DCS end-to-end system 1. This enables the CS Platform 115 to offer new services over time. New software upgrades can be offered through the remote software upgrade feature of the CS Platform. This enables more significant upgrades of the CS Platform 115 to be performed with user approval without the need for a tech rep to visit the user's site. This increases the frequency at which system upgrades can be deployed because cost is significantly reduced.

New hardware can be added with the appropriate services added remotely to the platform because of the above features and the use of COTS technology for most of the system hardware and software. An example of a new service requiring hardware extensions would be web camera based support for users. With the addition of a low cost USB web cam, the CS Platform 115 can offer a service for those subscribed that allows them to get better remote support on the phone because they can snap and send photos of the problems they are having to a help desk or call center.

Figure 19:
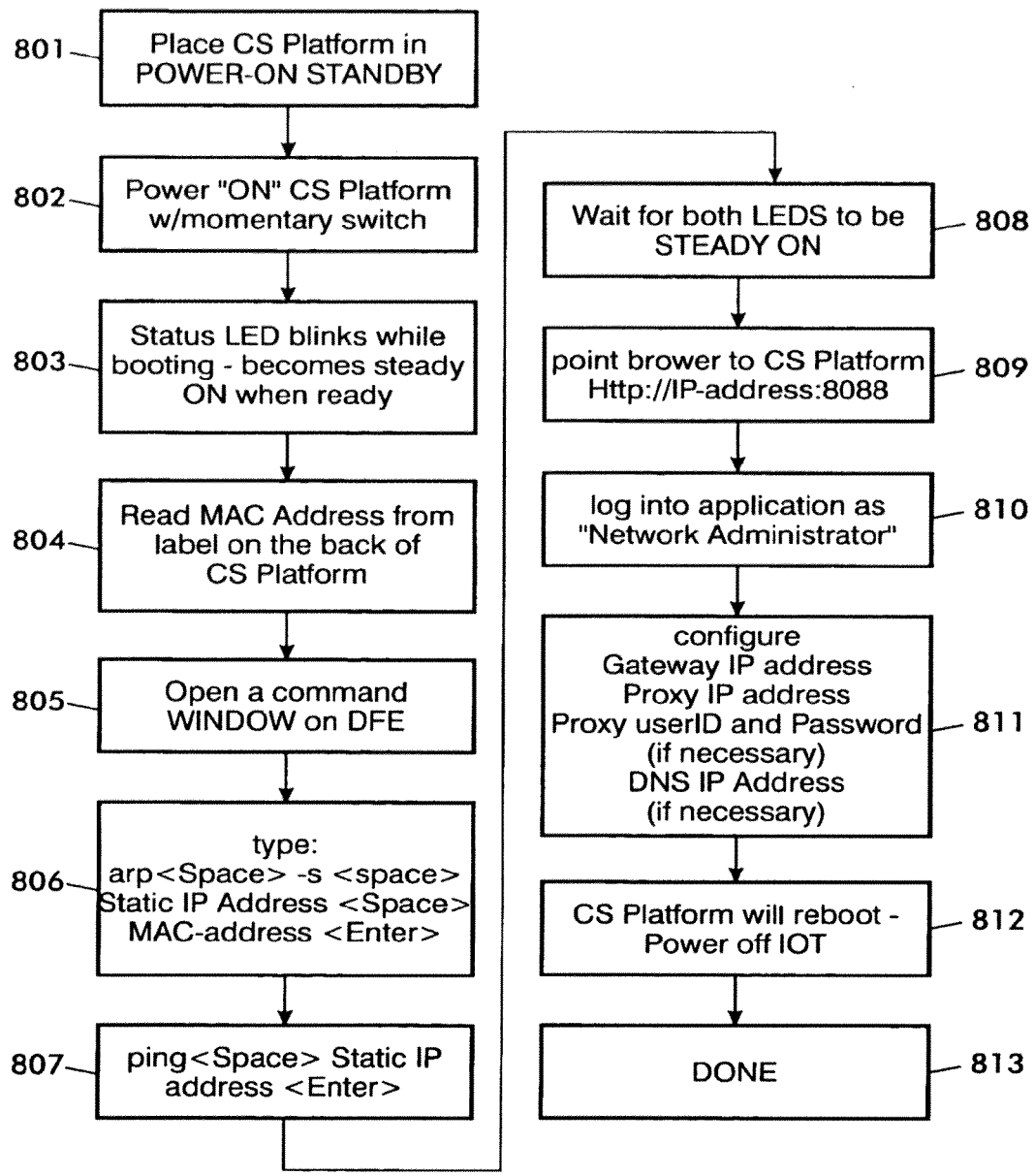
FIG. 19 is a schematic illustration of a method of setting up a CS Platform addon component according to embodiments.

Embodiments contemplate installation of the CS Platform on a network connected personal computer on the same subnet as the CS platform 115. The install process, a schematic illustration of which is shown in FIG. 19, uses a combination of standard networking utilities and LED indications found on the back of the CS Platform to walk the installer through the process. Since the CS Platform 115 is preferably a headless embedded system, the install process can be tricky. The steps listed here are one possible way to do the install, though others are possible. The combination of feedback on the command screen and LEDs on the device provide a robust process for the installation. The component 115 is initially in power-on standby (block 801) and is powered on by the user (block 802). Preferably, a status LED or the like first blinks to indicate that the component 115 is booting, and then becomes steady on when the component 115 is ready (block 803). In embodiments, the user reads the MAC address of the component 115 (block 804), opens a command window on the UI (block 805), and enters a command with the MAC address and other information (block 806). The user can then ping the component 115 (block 807) to test it, then wait for an indication of completion (block 808), such as one or more LEDs in a steady on state. The user then goes to the component's web server 130 via a browser (block 809), logs on as the administrator (block 810), and configures network information as required (block 811) to enable the component 115 to communicate with the edge host 410. The component 115 reboots, during which the IOT should be powered down (block 813). Once both have completed their reboot, installation and setup are complete {block 813).

The CS Platform can be configured in multiple ways for network connectivity, including use of a fixed IP address and use of DHCP to acquire an IP address. A fixed address is preferred for most users and has the advantage of making it easy to point a browser to the CS Platform UI when ready. DHCP is a very easy to install alternative, but would require a device domain name for the CS Platform and DNS services connection. One possible way to provide an automatic domain name is to combine the IOT serial number with the last two digits of the MAC address. Other combinations of readily available information known to the user and the CS Platform by default are possible.

The CS Platform is configured for the network just as any browser would be configured. This can be done manually via form fill-in on the CS Platform UI. It can also be done through a look-up to see the setting already found in the web browser platform if the OS provides that capability. This would provide the base-line settings and the user then has the ability to customize or correct them as necessary. Once configured, a Test Configuration button can be provided that immediately tries to contact the supplier edge server to ensure that the settings are correct before the user leaves the network administration page.

Users of the CS Platform 115 may lose a bookmark to the CS Platform Web Page and a way needs to be provided for users to find that web page again easily. If DHCP was used to configure the system, then the user can simply follow instructions to determine the default or hard coded domain name of the CS Platform. A discovery tool can also be provided that is installed and runs on the DFE or a networked personal computer in the user's environment and will find and display all CS Platforms that are running. This discovery tool could also be downloaded from the supplier web site. A link to the tool could be made available from the CS Platform UI so the tool can be downloaded and saved in preparation for CS Platform IP address loss. The tool could also come stored locally on the CS Platform with an option to save it locally on the DFE during install.

As mentioned above, the router manages simultaneous access methods to the CS Platform. The CS Platform router is preferably compatible with the supplier gateway and DMA requirements and with devices 110 in the field. The router preferably provides direct connectivity between the Local PWS port and the IOT diagnostic (serial) port. The router of embodiments also provides network connectivity for a network client through, for example, the IOT diagnostic (serial) port, and can support network pathways to the IOT CAN Bus, to the EP Service for various devices 110, and mediates all (except EP) communications traffic and priorities. Priorities are enabled to allow the smooth transition of operational modes. For example, a priority for Application Session for DCU Software Upgrade, another for Local PWS Port IOT Diagnostic Session at the IOT Serial port3, and another for other Network Sessions. Under normal system operation, an "open" Local PWS session is preferably not pre-empted, and a Local PWS session request may preferably interrupt a network diagnostic application session. Any interruption should be graceful. Preemption of a Network DCU software upgrade session is preferably not be permissible, though an EP and/or CAN Bus session should preferably be permitted at any time as long as only one CAN session is permitted at any one time. The DMA EP Gateway server/client client preferably has exclusive access to the EP port, and DCU V2.0 preferably supports a pathway for local PWS transactions over the network.

In support of DCU v2.0, the Communication Controller can provide, for example, the contents of local CSE diagnostic session over the network by generating a START_DIAG_SESSION event (Consumer of this event is DMA Push Event Provider), generating END_DIAG_SESSION event (Consumer of this event is DMA Push Event Provider), delivering each message between LOCAL_PWS_PORT and IOT_SERIAL communication ports as PWS_MESSAGE_EVENT to DMA Push Event Provider.

In further support of DCU v2.0, the Communication Controller can support a local CSE diagnostic connection through the Local PWS port to the IOT serial port by providing a method to communicate its presence to the PWS connected to the system, for example by utilizing the RS232 signal designated as the CTS (Clear To Send) signal. The CTS signal is preferably held at logic level HIGH at the DCU.

The DSR (Data Signal Ready) signal in the RS232 interface can control the diagnostic mode of the IOT. The DCU will preserve or as necessary 'create' this control. If the IOT is in the diagnostic mode and is powered off it will power up in the diagnostics mode when the DSR signal to the IOT has been set HIGH. The PSW controls the DSR signal.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The following is claimed:

1. A diagnostic system for at least one document processing device, the diagnostic system comprising:
   a connection to at least one input-output terminal (IOT) of at least one document processing device through at least one existing device interface to provide a common device model, common information management (CIM) application programming interface (API), and an environment in which device services can run;
   data collection and display functionality;
   a user interface (UI) accessible by a user and in communication with an operating system of the at least one document processing device, the UI including at least one UI element representing at least one diagnostic routine for the at least one document processing device;
   a services platform;
   at least one application programming interface (API) for remote connectivity and device-centric services; and
   at least one device model agent (DMA) representing the at least one document processing device to a remote services host that provides services to which the at least one document processing device can subscribe and to a remote asset management system.

2. The diagnostic system of claim, wherein the at least one DMA is operative to:
   communicate a status of the document processing device, a configuration of the document processing device, and services offered by the at least one document processing device to the remote services host and to the remote asset management system using a common transaction language,
   provide a services environment that is a runtime environment for the services on the at least one document processing device to provide device-independence for the services offered by the remote services host;
   actively and dynamically monitor information about the at least one document processing device including at least one of device configuration, device status, and one or more device supply levels,
   dynamically provision the at least one document processing device to automatically download software as needed to add, delete, update, and customize the services offered by the at least one document processing device which are determined by the remote services host and the remote asset management system, and
   to communicate, through the local UI, services to be selectively added to or performed on the at least one document processing device.

3. The diagnostic system of claim, wherein the at least one DMA comprises:
   a DMA core including:
     a common information model (CIM) API,
     a common information model object manager (CIMOM), and
     a service manager; and
   a common provider API operative to:
     communicate with at least one device-specific provider API to retrieve information about the at least one document processing device including at least one of device configuration, device status, and one or more device supply levels, and
     make the retrieved information about the at least one document processing device available to the CIMOM, the service manager, and to the services running in the services environment.

4. The diagnostic system of claim 3, wherein the at least one DMA resides between the at least one device-specific API and a services layer that includes a collection of running services, and wherein the at least one DMA is connected to a communications medium to communicate directly with the remote services host and the remote asset management system.

5. The diagnostic system of claim 1, further comprising a networked personal computer in a housing with no direct input or output devices.

6. The diagnostic system of claim 1, connection to the LOT is through at least two physical interfaces.

7. The diagnostic system of claim 1, wherein the UI is available via a browser running on a computer on a network to which the at least one document processing device is connected.

8. The diagnostic system of claim 1, further comprising a web server.

9. The diagnostic system of claim 1, wherein the at least one DMA is operative to selectively invoke a diagnostic routine on the at least one document processing device in response to active, dynamic monitoring of the occurrence of a document processing device event of interest as directed by internal or external clients or users.

10. The diagnostic system of claim 1, wherein device status indicates device conditions including availability of communication between the at least one DMA and the LOT of the at least one document processing device.

11. The diagnostic system of claim 1, wherein at least one DMA includes an applications/services execution/runtime environment residing between a Java runtime environment and an embedded server.

12. The diagnostic system of claim 1, wherein the diagnostic system is integrated within the at least one document processing device.

13. The diagnostic system of claim 12, wherein the DMA is stored within a nonvolatile memory of the at least one document processing device.

14. The diagnostic system of claim 1, further comprising at least one device provided diagnostic routine preexisting on the at least one document processing device.

15. The diagnostic system of claim 14, wherein the at least one device provided diagnostic routine includes a registration control routine that sets up the complete image on image registration system found in the IOT.

16. The diagnostic system of claim 14, wherein the at least one device provided diagnostic routine includes a halftone routine that adjusts the halftone densities printed by the at least one document processing device.

17. The diagnostic system of claim 1, further comprising at least one service provided diagnostic routine.

18. The diagnostic system of claim 17, wherein the at least one service provided diagnostic routine includes a method of executing a plurality of routines in a specific order to optimize toner density levels and obtain consistent image quality.

19. The diagnostic system of claim 17, wherein the at least one device provided diagnostic routine includes a belt edge learn routine that learns the edge of a new intermediate belt to improve lateral registration and belt steering performance.

20. The diagnostic system of claim 1, wherein the UI is accessible from any networked personal computer with a suitable browser.

* * * * *

UNITED STATES PATENT AND TRADEMARK OFFICE
CERTIFICATE OF CORRECTION

| | | |
|---|---|---|
| PATENT NO. | : 8,194,275 B2 | Page 1 of 1 |
| APPLICATION NO. | : 13/334917 | |
| DATED | : June 5, 2012 | |
| INVENTOR(S) | : Michael R. Furst et al. | |

It is certified that error appears in the above-identified patent and that said Letters Patent is hereby corrected as shown below:

IN THE CLAIMS:

In Column 36, Claim 2, line 24, please insert the number --1-- after the word -claim- and before the -,-

In Column 36, Claim 3, line 49, please insert the number --2-- after the word -claim- and before the -,-

Signed and Sealed this
Thirtieth Day of April, 2013

Teresa Stanek Rea
*Acting Director of the United States Patent and Trademark Office*